(12) United States Patent
Romeres et al.

(10) Patent No.: US 12,346,115 B2
(45) Date of Patent: Jul. 1, 2025

(54) METHOD AND SYSTEM FOR MODELLING AND CONTROL PARTIALLY MEASURABLE SYSTEMS

(71) Applicant: Mitsubishi Electric Research Laboratories, Inc., Cambridge, MA (US)

(72) Inventors: Diego Romeres, Boston, MA (US); Fabio Amadio, Padua (IT); Alberto Dalla Libera, Padua (IT); Riccardo Antonello, Padua (IT); Ruggero Carli, Padua (IT); Daniel Nikovski, Brookline, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 124 days.

(21) Appl. No.: 17/112,531

(22) Filed: Dec. 4, 2020

(65) Prior Publication Data
US 2022/0179419 A1    Jun. 9, 2022

(51) Int. Cl.
*G05D 1/00*      (2024.01)
*B60W 10/08*     (2006.01)
(Continued)

(52) U.S. Cl.
CPC .............. *G05D 1/021* (2013.01); *B60W 10/22* (2013.01); *B60W 30/00* (2013.01); *G05B 13/0265* (2013.01); *B60W 10/08* (2013.01)

(58) Field of Classification Search
CPC ............ G06N 5/00; G06N 5/003; G06N 5/02; G06N 5/04; G06N 5/006; G06N 5/022;
(Continued)

(56) References Cited

U.S. PATENT DOCUMENTS

| 7,043,462 B2 * | 5/2006 | Jin ........................ G06N 3/126 706/13 |
| 2010/0030578 A1 * | 2/2010 | Siddique ................. H04W 4/00 705/26.1 |

(Continued)

OTHER PUBLICATIONS

Sutton, Richard S., and Andrew G. Barto. Reinforcement Learning: An Introduction. MIT Press, 1998. (Year: 1998).*
(Continued)

*Primary Examiner* — Angela Y Ortiz
*Assistant Examiner* — Aaron K McCullers
(74) *Attorney, Agent, or Firm* — Gene Vinokur

(57) ABSTRACT

A controller for controlling a system that includes a policy to control the system is provided. The controller includes an interface connected to the system, the interface acquires an action state and a measurement state via sensors measuring the system, a memory to store computer-executable program modules including a model learning module and a policy learning module, a processor that performs steps of the program modules. The steps include offline-modeling to generate offline-learning states based on the action state and measurement state using the model learning program, providing the offline states to the policy learning program to generate policy parameters, and updating the policy of the system to operate the system based on the policy parameters.

13 Claims, 20 Drawing Sheets

(51) Int. Cl.
*B60W 10/22* (2006.01)
*B60W 30/00* (2006.01)
*G05B 13/02* (2006.01)

(58) Field of Classification Search
CPC ........ G06N 5/027; G06N 5/025; G06N 5/041;
G06N 5/042; G06N 5/043; G06N 5/045;
G06N 5/046; G06N 5/048; G06N 5/047;
G06N 7/023; G06N 7/02; G06N 7/06;
G06N 7/00; G06N 20/00; G06N 20/10;
G06N 20/20; G05B 19/41865; G05B
23/0283; G05B 19/41875; G05B
2219/45129; G05B 23/024; G05B
23/0264; G05B 23/0294; G05B 19/4183;
G05B 19/4184; G05B 23/0221; G05B
13/028; G05B 19/41845; G05B 19/4185;
G05B 2219/32287; G05B 2219/35001;
G05B 2219/37337; G05B 2219/37351;
G05B 2219/37434; G05B 2219/40115;
G05B 2219/45004; G05B 23/0229; G05B
23/0286; G05B 23/0289; G05B 23/0291;
G05B 23/0297; G05B 19/042; G05B
2219/37537; G05B 23/02; G05B 23/0208;
G05B 2219/45031; G05B 17/02; G05B
15/02; G05B 13/048; G05B 13/0265;
G05B 19/0425; G05B 2219/25428; G05B
2219/33331; G05B 13/042; G05B
19/41885; G05B 2219/31467; G05B
2219/31472; G05B 2219/32335; G05B
2219/32342; G05B 2219/35494; G05B
2219/30; G05B 2219/31; G05B
2219/32128; G05B 2219/32267; G05B
2219/32329; G05B 2219/32351; G05B
2219/40411; G05B 2219/40412; G05B
2219/40413; G05B 2219/40419; G05B
2219/40424; G05B 23/0267; G05B 99/00;
G05B 19/406; G05B 2219/32014; G05B
2219/31265; G05B 2219/32306; G05B
2219/36513; G05B 2219/33192; G05B
2219/36395; G05B 2219/36511; G05B
2219/37572; G05B 2219/40283; G05B
2219/40284; G05B 13/027; G05B
2219/31282; G05B 13/024; G05B
19/0428; G05B 23/0254; B25J 9/163

USPC ...... 700/28, 31, 47, 48, 245; 701/37, 40, 41,
701/44, 59, 69, 70, 71, 82, 88, 91, 98
See application file for complete search history.

(56) References Cited

U.S. PATENT DOCUMENTS

| | | | |
|---|---|---|---|
| 2010/0094786 A1* | 4/2010 | Gupta | G06N 3/006 706/12 |
| 2011/0246409 A1* | 10/2011 | Mitra | G06F 17/18 702/179 |
| 2013/0215116 A1* | 8/2013 | Siddique | G06Q 20/40 705/26.7 |
| 2014/0235474 A1* | 8/2014 | Tang | C12Q 1/6869 702/19 |
| 2018/0012137 A1* | 1/2018 | Wright | G05B 13/0265 |
| 2018/0284758 A1* | 10/2018 | Cella | G05B 23/0286 |

OTHER PUBLICATIONS

Kormushev, P., and Caldwell, D. G. Direct policy search reinforcement learning based on particle filtering. In Proceedings of the 10th European Workshop on Reinforcement Learning (2012). (Year: 2012).*

Yaakov Engel, Shie Mannor, and Ron Meir. 2005. Reinforcement learning with Gaussian processes. In Proceedings of the 22nd international conference on Machine learning (ICML '05). Association for Computing Machinery, New York, NY, USA, 201-208. https://doi.org/10.1145/1102351.1102377 (Year: 2005).*

J. Ko, D. J. Klein, D. Fox and D. Haehnel, "Gaussian Processes and Reinforcement Learning for Identification and Control of an Autonomous Blimp," Proceedings 2007 IEEE International Conference on Robotics and Automation, Rome, Italy, 2007, pp. 742-747 , doi: 10.1109/ROBOT.2007.363075. (Year: 2007).*

Yarin et al. "Improving PILCO with Bayesian Neural Network Dynamics Models," ICML, vol. 4, p. 34, 2016. pp 1-7.

Amadio et al., "Model Based Policy Search using Monte Carlo Gradient Estimation with Real Systems Application," ARXIV.Org. Cornell Universuty Library. 201 Olin Library Cornell Univ. Ithaca, NY, 14853. May 3, 2021, abstract.

Amadio et al., "Model Based Policy Search for Partially Measurable Systems," , ARXIV.Org. Cornell Universuty Library. 201 Olin Library Cornell Univ. Ithaca, NY, 14853. Jan. 21, 2021.

* cited by examiner

| parameter | description | value |
|---|---|---|
| $p_d$ | dropout probability | 0.25 |
| $\Delta p_d$ | $p_d$ reduction coeff. | 0.125 |
| $\alpha_{lr}$ | Adam step size | 0.01 |
| $\alpha_{lr,min}$ | minimum step size | 0.0025 |
| $\alpha_s$ | EMA filter coeff. | 0.99 |
| $\sigma_s$ | monitoring signal treshold | 0.08 |
| $n_s$ | num. iterations monitoring | 200 |
| $\lambda_s$ | $\sigma_s$ reduction coeff. | 0.5 |

Standard values for the policy optimization parameters.

Fig. 1E

Algorithm 1: MC-PILCO init policy $\pi_\theta(\cdot)$, cost $c(\cdot)$, kernel $k(\cdot,\cdot)$, maximum optimization steps $N_{opt}$, number of particles $M$, learning rate $\alpha_{lr}$, min. learning rate $\alpha_{lr,min}$, dropout probability $p_d$, dropout probability reduction $\Delta_{p_d}$, and other monitoring signal parameters: $\sigma_s$, $\lambda_s$, $n_s$.

Apply random control to system and collect data
while *task not learned* do

1) Model Learning:
    Learn GP models from sampled data - Sec. III-A;
    2) Policy Update:
    Initialize monitoring signal $s_0 = 0$;
    for $j = 1,...,N_{opt}$ do
        Simulate $M$ particles rollouts with GP models and current policy $\pi_{\theta_j}(\cdot)$;
        Compute $\hat{J}(\theta_j)$ from particles (12);
        Compute $\nabla_\theta \hat{J}(\theta_j)$ through backpropagation;
        $\pi_{\theta_{j+1}}(\cdot) \leftarrow$ Gradient-based policy update;
        Update monitoring signal $s_j$ with (13);
        if (14) *is True* then
            Update $p_d$, $\alpha_{lr}$, and $\sigma_s$ with (15);
        end
        if (16) *is False* then
            break;
        end
    end
    3) Policy Execution:
    apply updated policy to system and collect data
end
return final policy $\pi_{\theta^*}(\cdot)$, learned GP model.

Fig. 1F

| | Trial 1 | Trial 2 | Trial 3 | Trial 4 | Trial 5 |
|---|---|---|---|---|---|
| Dropout OFF | 0% | 12% | 62% | 86% | 94% |
| Dropout ON | 0% | 14% | 78% | 100% | 100% |

| | Trial 1 | Trial 2 | Trial 3 | Trial 4 | Trial 5 |
|---|---|---|---|---|---|
| PILCO | 2% | 4% | 20% | 36% | 42% |
| Black-DROPS | 0% | 4% | 30% | 68% | 86% |
| MC-PILCO | 0% | 38% | 86% | 100% | 100% |

| | | $e_p$ [m] | $e_\theta$ [rad] |
|---|---|---|---|
| 1 | S.I. SE+P(2) (3,1) drop. on | 0.008 ± 0.009 | 0.011 ± 0.012 |
| 2 | S.I. SE (3,1) drop. on | 0.009 ± 0.012 | 0.010 ± 0.012 |
| 3 | S.I. SE (0.75,0.25) drop. off | 0.016 ± 0.028 | 0.012 ± 0.024 |
| 4 | S.I. SE (3,1) drop. off | 0.014 ± 0.034 | 0.011 ± 0.020 |
| 5 | F.S. SE (3,1) drop. on | 0.011 ± 0.016 | 0.011 ± 0.015 |
| 6 | Black-DROPS | 0.025 ± 0.032 | 0.033 ± 0.058 |
| 7 | PILCO | 0.027 ± 0.036 | 0.045 ± 0.057 |

Fig. 6C

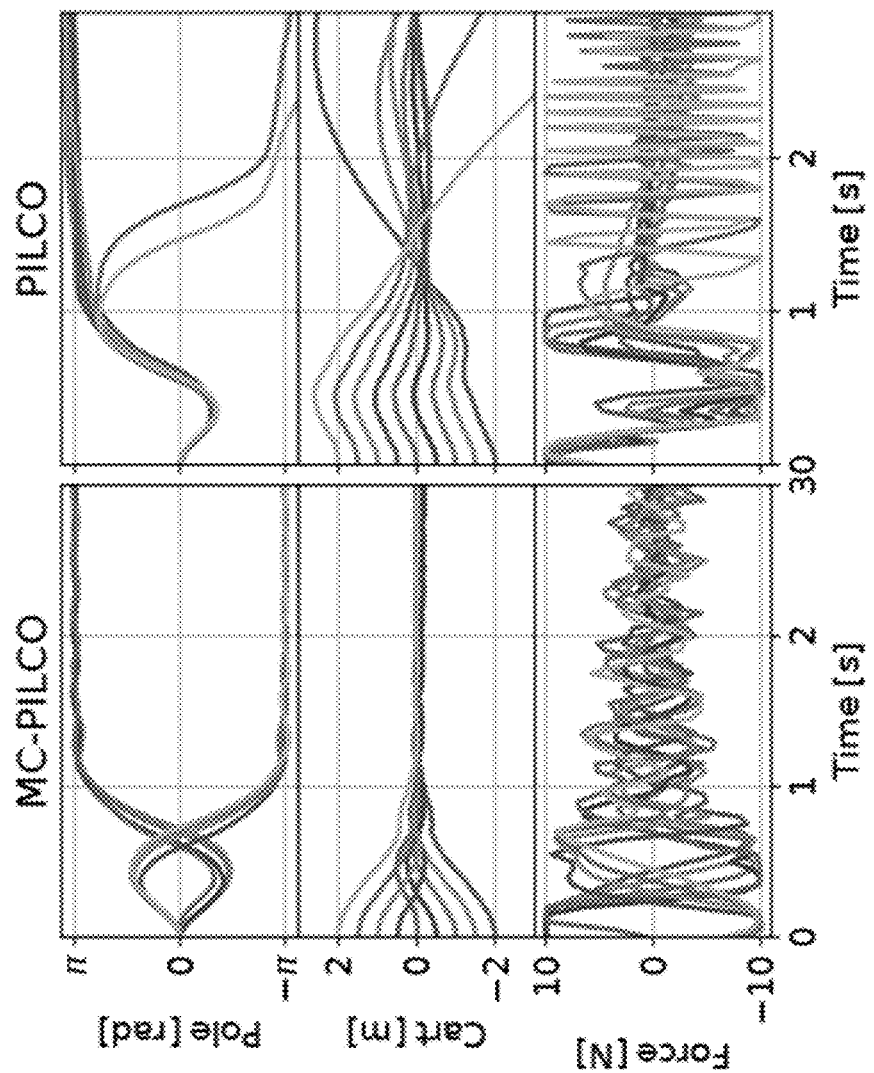

Block schemes illustrating particles generation in MC-PILCO and MC-PILCO4PMS.

METHOD AND SYSTEM FOR MODELLING AND CONTROL PARTIALLY MEASURABLE SYSTEMS

FIELD OF THE INVENTION

The present invention is related generally to a method and system for modelling and controlling partially and fully measurable systems, which include mechanical systems.

BACKGROUND

In recent years, reinforcement learning (RL) has achieved outstanding results in many different environments, and has shown the potential to provide an automated framework for learning different control applications from scratch. However, model-free RL (MFRL) algorithms might require a massive amount of interactions with the environment in order to solve the assigned task. The data inefficiency puts a limit to RL's potential in real-world applications, due to the time and cost of interacting with them. In particular, when dealing with mechanical systems, it is critical to Team the task after the least possible amount of trials, to reduce wear and tear and avoid any damage to the system.

There is a need to develop a method that takes account for modeling and filtering different components before model learning and before policy optimization.

SUMMARY OF THE INVENTION

An object of some embodiments of the invention is to provide a promising way to overcome the limit described above is model-based reinforcement learning (MBRL), which is based on the use of data from interactions to build a predictive model of the environment and to exploit it to plan control actions. MBRL increases data efficiency by using the model to extract more valuable information from the available data.

Some embodiments of the present invention are based on recognition that MBRL methods are effective only inasmuch as their models resemble accurately the real systems. Hence, deterministic models might suffer dramatically from model inaccuracy, and the use of stochastic models becomes necessary in order to capture uncertainty. Gaussian Processes (GPs) are a class of Bayesian models commonly used in RL methods precisely for their intrinsic capability to handle uncertainty and provide principled stochastic predictions. Further, PILCO (Probabilistic Inference for Learning Control) can be a successful MBRL algorithm that uses GP models and gradient-based policy search to achieve substantial data efficiency in solving different control problems, both in simulation as well as with real systems. In PILCO, long-term predictions are computed analytically, approximating the distribution of the next state at each time instant with a Gaussian distribution by means of moment matching. In this way, the policy gradient is computed in closed form. However, the use of moment matching may introduce two relevant challenges. (i) Moment matching allows modeling of only unimodal distributions. This fact, besides being a potential incorrect assumption on the system dynamics, it introduces relevant limitations related to initial conditions. In particular, the restriction on the use of unimodal distributions complicates dealing with multimodal initial conditions, as well as being a potential limitation even when the system initial state is unimodal. For instance, in case that the initial variance is high, the optimal solution might be multimodal, due to dependencies on initial conditions. (ii) The computation of the moments is shown to be tractable only when considering Squared Exponential (SE) kernels and differentiable cost functions. In particular, the limitation on the kernel choice might be very stringent, as GPs with SE kernel impose smooth properties on the posterior estimator and might show poor generalization properties in data that have not be seen during training.

Further, some embodiments of the present invention are based on recognition that PILCO has inspired several other MBRL algorithms, which try to improve it in different ways. Limitations due to the use of SE kernels have been addressed in Deep-PILCO, where the system evolution can be modeled using Bayesian Neural Networks, and long-term predictions are computed combining particle-based methods and moment matching. Results show that, compared to PILCO, Deep-PILCO requires a larger number of interactions with the system in order to learn the task. This fact suggests that using neural networks (NNs) might not be advantageous in terms of data-efficiency, due to the considerably high amount of parameters needed to characterize the model. A more articulated approach may use a probabilistic ensemble of NNs to model the uncertainty of the system dynamics. Despite the positive results in the simulated high-dimension systems, the numerical results show that GPs are more data-efficient than NNs when considering low-dimensional systems, such as the cart-pole benchmark. An alternative route may use a simulator to learn a prior for the GP model before starting the reinforcement learning procedure on the actual system to control. This simulated prior can improve the performance of PILCO in areas of the state space with no available data points. However, the method requires an accurate simulator that may not always be available for the users. Some challenges may be due to the gradient-based optimization were addressed in Black-DROPS, which adopts a gradient-free policy optimization. Some embodiments are based on recognition that non-differentiable cost functions can be used, and the computational time can be improved with the parallelization of the black-box optimizer. With this strategy, Black-DROPS achieves similar data efficiency to PILCO's, but significantly increases asymptotic performance.

Further, some embodiments of the present invention are based on recognition that there are other approaches focused on improving the accuracy of long-term predictions, overcoming approximations due to moment matching. An attempt can be an approach where long-term distributions are computed relying on particle-based methods. Based on the current policy and the one-step-ahead GP models, one can simulate the evolution of a batch of particles sampled from the initial state distribution. Then, the particle trajectories are used to approximate the expected cumulative cost. The policy gradient can be computed using a strategy, where by fixing the initial random seed, a probabilistic Markov decision process (MDP) is transformed into an equivalent partially observable MDP with deterministic transitions. Compared to PILCO, results obtained where not satisfactory. The poor performance was attributed to the policy optimization method, in particular, to inability to escape from the numerous local minima generated by the multimodal distribution. Another particle-based approach can be PIPPS, where the policy gradient is computed with the so-called reparameterization trick instead of the PEGASUS strategy. Given a distribution $p_\theta(\cdot)$, parameterized by $\theta$, the reparameterization trick provides an alternative method for generating samples from $p_\theta(\cdot)$ such that those samples are differentiable w.r.t. $\theta$. The reparameterization trick has been introduced with successful results in stochastic variational inference (SVI). In contrast with the results obtained in SVI, where just a few samples are needed to estimate the gradient, there can be several issues related to the gradient computed with the reparameterization trick, due to its exploding magnitude and random direction. To overcome these issues, they proposed the total propagation algorithm, where the reparameterization trick is combined with the likelihood ratio gradient. The algorithm performs similarly to PILCO with some improvements in the gradient computation and in the performance in the presence of additional noise.

Some embodiments disclose an MBRL algorithm named Monte Carlo Probabilistic Inference for Learning COntrol (MC-PILCO). Like PILCO, MC-PILCO is a policy gradient algorithm, which uses GPs to describe the one-step-ahead system dynamics and relies on a particle-based method to approximate the long-term state distribution instead than using moment matching. The gradient of the expected cumulative cost w.r.t. the policy parameters is obtained by backpropagation on the associated stochastic computational graph, exploiting the reparameterization trick. Differently than in PIPPS, where they focused on obtaining accurate estimates of the gradient, we can interpret the optimization problem as a stochastic gradient descent (SGD) problem. This problem has been studied in depth in the context of neural networks, where overparameterized models are optimized using noisy estimates of the gradient. Analytical and experimental studies show that the shape of the cost function and the nonlinear activation function adopted can affect dramatically the performance of SGD algorithms. Motivated by the results obtained in this field, w.r.t. the previous particles-based approaches, we considered the use of more complex policies and less peaked cost functions, i.e., less penalizing costs. During policy optimization we also considered the application of dropout to the policy parameters, in order to improve the ability to escape from local minima, obtaining more performing policies. The effectiveness of the proposed choice is ablated and analyzed in simulation. First, a simulated cart-pole, a common benchmark system, was considered to compare MC-PILCO with PILCO and Black-DROPS. Results show that MC-PILCO outperforms both PILCO and Black-DROPS, which can be considered state-of-the-art GP-based MBRL algorithms. Second, with the purpose to evaluate the behavior of MC-PILCO in a higher-dimensional system, we applied it to a simulated UR5 robotic arm. The considered task consists of learning a joint-space controller able to follow a desired trajectory and it was successfully accomplished. These results confirm that the reparameterization trick can be used effectively in MBRL, and Monte Carlo methods do not suffer of gradient estimation problems, as commonly asserted in literature, if properly considering the cost function, the use of dropout and complex/rich policies.

Moreover, differently from previous works which combined GPs with particle-based methods, we show a relevant advantage of this strategy, namely, the possibility of adopting different kernel functions. We consider the use of a kernel function given by the combination of an SE kernel and a polynomial kernel, as well as a semiparametrical model. Results obtained both in simulation and in a real Furuta pendulum show that the use of such kernels significantly increases data efficiency, limiting the interaction time required to learn the tasks.

Finally, MC-PILCO is applied and analyzed in partially measurable systems, and takes the name of MC-PILCO4PMS. Unlike simulated environments, where the state is typically assumed to be fully measurable, the state of real systems might be partially measurable. For instance, most of the time, only positions are directly measured in real robotic systems, while velocities are typically computed by means of estimators, such as state observers, Kalman filters, and numerical differentiation with low-pass filters. In particular, the controller, i.e., the policy, works with the output of online state estimators which, due to noise and real-time computation constraints, might introduce significant delays and discrepancies w.r.t. to the filtered data used during policy training. In this context, we verified that during policy optimization it is important to distinguish between the states generated by the models, which aim at describing the evolution of the real system state, and the states provided to the policy. Indeed, providing to the control policy the model predictions corresponds to assume to measure directly the system state, which, as mentioned before, is not possible in the real system. This incorrect assumption might compromise the effectiveness of the trained policy into the real system, due to the presence of distortions caused by the online state estimators. Hence, during policy optimization, from the evolution of the system state predicted by the GPs models, we compute the estimates of the states observed by modeling both the measurement system and the online estimators used in the real system. Then we feed to the policy the estimates of the observed states. In this way, we aim at obtaining robustness w.r.t. the delays and distortions caused by online filtering. The effectiveness of the proposed strategy has been tested both in simulation and also with two real systems, a Furuta pendulum and a ball-and-plate system. The obtained performance confirms the importance of considering the presence of filters in the real system during policy optimization.

Some embodiments of the present invention are based on recognition that a controller can be provided for controlling a system that includes a policy configured to control the system. In this case, the controller may include an interface connected to the system, the interface being configured to acquire an action state and a measurement state via sensors measuring the system; a memory to store computer-executable program modules including a model learning module and a policy learning module; a processor configured to perform steps of the program modules. Further, the steps include offline-modeling to generate offline-learning states based on the action state and measurement state using the model learning program, wherein the model learning module includes an offline state estimator and a model-learning program, wherein the offline state estimator estimates and provides the offline state estimates to the model-learning program, wherein the policy learning module includes a system model, a model of the sensor a model of the online state estimator and a policy optimization program, wherein the system model generates the particle states that approximate the state of the real system, wherein the model of the sensor approximates the particle measurements that approximate the measurements on the real system based on the particle states, wherein the model of the online state estimator is configured to generate particle online estimates based on the particle measurements and possibly prior particle online estimates, wherein the policy optimization program generates the policy parameters; providing the offline states to the policy learning module to generate policy parameters; and updating the policy of the system to operate the system based on the policy parameters.

According to another embodiment of the present invention, a vehicle control system is provided for controlling motions of a vehicle. The vehicle control system may include the controller that may include an interface connected to the system, the interface being configured to acquire an action state and a measurement state via sensors measuring the system; a memory to store computer-executable program modules including a model learning module and a policy learning module; a processor configured to perform steps of the program modules. Further, the steps include offline-modeling to generate offline-learning states based on the action state and measurement state using the model learning program, wherein the model learning module includes an offline state estimator and a model-learning module, wherein the offline state estimator estimates and provides the offline state estimates to the model-learning program, wherein the policy learning module includes a system model, a model of the sensor a model of the online state estimator and a policy optimization program, wherein the system model generates the particle states that approximate the state of the real system, wherein the model of the sensor approximates the particle measurements that approximate the measurements on the real system based on the particle states, wherein the model of the online state estimator is configured to generate particle online estimates based on the particle measurements and possibly prior particle online estimates, wherein the policy optimization program generates the policy parameters; providing the offline states to the policy learning program to generate policy parameters; and updating the policy of the system to operate the system based on the policy parameters, wherein the controller is connected to a motion controller of the vehicle and vehicle motion sensors that measure the motions of the vehicle, wherein the control system generates policy parameters based on measurement data of the motion, wherein the control system provides the policy parameters to a motion controller of the vehicle to update a policy unit of the motion controller.

Yet further, some embodiments of the present invention provide a robotic control system for controlling motions of a robot. The robotic control system may include an interface connected to the system, the interface being configured to acquire an action state and a measurement state via sensors measuring the system; a memory to store computer-executable program modules including a model learning module and a policy learning module; a processor configured to perform steps of the program modules. Further, the steps include offline-modeling to generate offline-learning states based on the action state and measurement state using the model learning program, wherein the model learning module includes an offline state estimator and a model-learning module, wherein the offline state estimator estimates and provides the offline state estimates to the model-learning program, wherein the policy learning module includes a system model, a model of the sensor a model of the online state estimator and a policy optimization program, wherein the system model generates the particle states that approximate the state of the real system, wherein the model of the sensor approximates the particle measurements that approximate the measurements on the real system based on the particle states, wherein the model of the online state estimator is configured to generate particle online estimates based on the particle measurements and possibly prior particle online estimates, wherein the policy optimization program generates the policy parameters; providing the offline states to the policy learning program to generate policy parameters; and updating the policy of the system to operate the system based on the policy parameters, wherein the controller is connected to an actuator controller of the robot and sensors that is configured to measure states of the robot, wherein the control system generates policy parameters based on measurement data of the sensors, wherein the control system provides the policy parameters to the actuator controller of the robot to update a policy unit of the actuator controller.

BRIEF DESCRIPTION OF THE DRAWINGS

The accompanying drawings, which are included to provide a further understanding of the invention, illustrate embodiments of the invention and together with the description serve to explain the principle of the invention.

FIG. 1E shows a table indicating examples of standard values of the policy optimization parameters, according to embodiments of the present invention;

FIG. 1F shows an algorithm of MC-PILCO, according to embodiments of the present invention;

FIG. 6c shows a table with the comparison of the errors of an algorithm MC-PILCO with different options (lines 1-5), of an algorithm Black-DROPS (line 6) and of an algorithm PILCO (line 7), according to embodiments of the present invention;

FIG. 7A shows a plot of the behavior of a Cart-pole system controlled by an algorithm MC-PILCO, according to embodiments of the present invention;

FIG. 7B shows a plot of the behavior of a Cart-pole system controlled by an algorithm PILCO, according to embodiments of the present invention;

DETAILED DESCRIPTION OF THE PREFERRED EMBODIMENTS

Figure 1A:
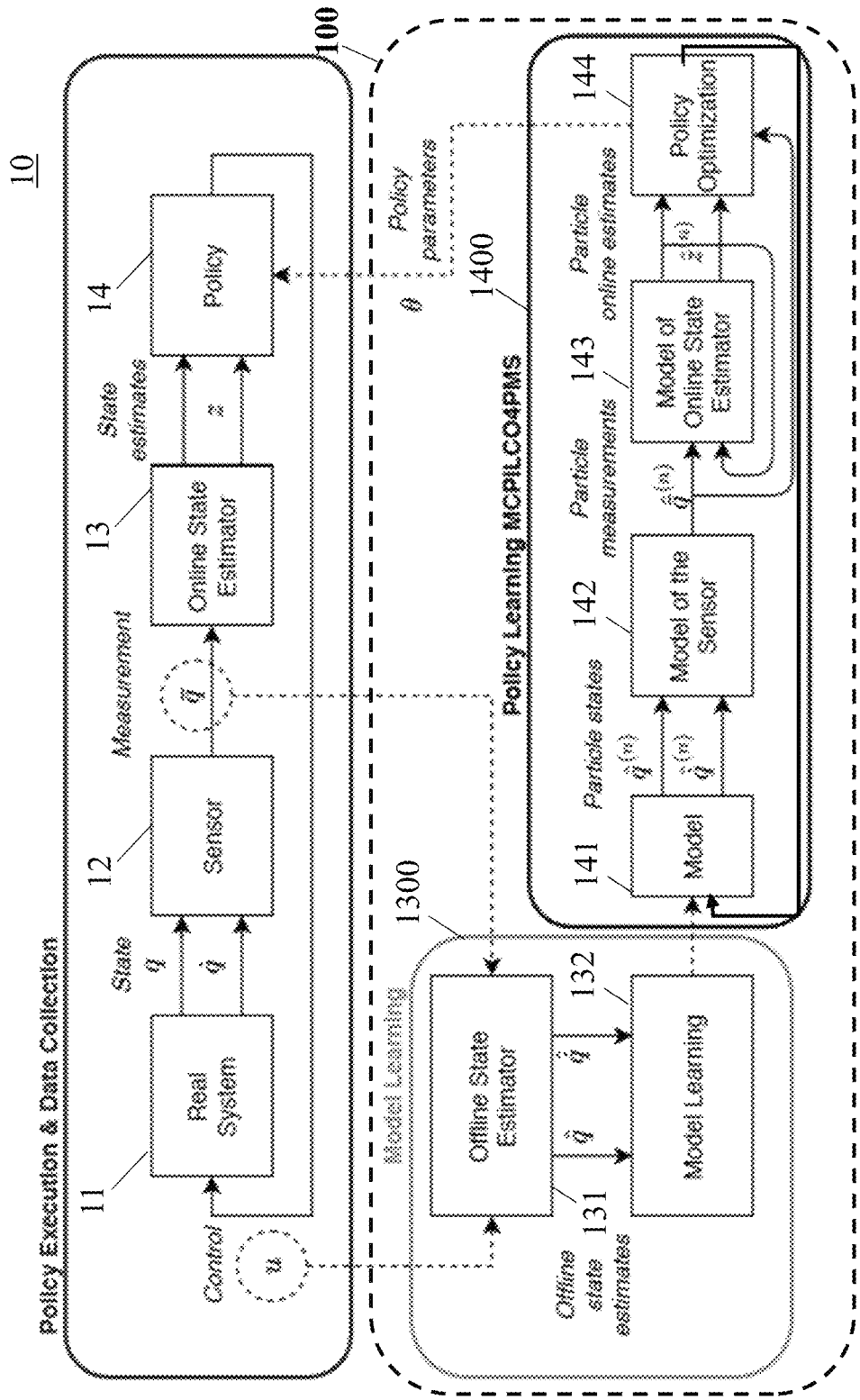
FIG. 1A shows a block diagram illustrating a system being controlled via a controller according to embodiments of the present invention.

Various embodiments of the present invention are described hereafter with reference to the figures. It would be noted that the figures are not drawn to scale and elements of similar structures or functions are represented by like reference numerals throughout the figures. It should be also noted that the figures are only intended to facilitate the description of specific embodiments of the invention. They are not intended as an exhaustive description of the invention or as a limitation on the scope of the invention. In addition, an aspect described in conjunction with a particular embodiment of the invention is not necessarily limited to that embodiment and can be practiced in any other embodiments of the invention.

According to some embodiments of the present invention, there are advantages that can provide higher performance in control partially measurable systems thanks to considering two different state estimators. Partially measurable systems are systems where only a subset of the state components can be directly measured, and the remaining components can be estimated through proper state estimators. Partially measurable systems are particularly relevant in real world applications, as they include for example mechanical systems (e.g., vehicles and robotic systems) where, typically, only positions are measured, while velocities are estimated thorough numerical differentiation or more complex filters. Some embodiments of the present invention model the presence of two different state estimators, wherein the model learning module an offline state estimator and wherein the policy learning module a model of the sensor and a model of the online state estimator. According to some embodiments of the present invention, the presence of the offline state estimator improves the accuracy of the model learning module and the presence of a model of the sensor and a model of the online state estimator improves the performance of the policy learning module.

FIG. 1A shows a block diagram illustrating a system module 10 being controlled via a controller 100 according to embodiments of the present invention. The component of the system module 10 is illustrated by a block diagram of a general example application to which the controller 100 according to some embodiment of the present invention can be applied. The controller 100 represents a block diagram of some embodiments of the present invention.

In the system module 10, the components 11, 12, 13 and 14 represent the schematic of the policy execution and data collection of a real system 11. The component 11 represents a real physical system 11 that can be controlled by the controller 100 according to some embodiments of the present invention. Example of the components 11 may be vehicle systems, robot systems and suspension systems. The real system 11 may be subject to a control signal u (action state u) which makes the real system 11 move into a state. The state is then measured by a sensor 12. The state definition varies according to the real system 11.

When the real system 11 is a vehicle, the state can be the orientation of the vehicle, the steering angle and the velocities along the two axes of the vehicle. When the real system 11 is a robotic system, the state can be the joint positions and joint velocities. When the real system 11 is a suspension system of a vehicle, the state can be the displacement and the velocity of the displacement of the suspension system from the resting position. The sensor 12 measures the state and outputs a measurement of the state. Most common sensors can measure only some part of the state but not all the components of the state. For example, positioning sensors like encoders, potentiometers, proximity sensors and cameras can measure only the positions components of the state; other sensors like tachometers, laser surface velocimeters, piezoelectric sensors can measure only the velocity components of the state; other sensors like accelerometers can only measure the acceleration of the system. All these sensors do not output the full state and for this reason the measurements, the output of the sensor 12, are only a part of the state. For this reason, the controller 100 according to some embodiments of the present invention can control the real system 11 based on handling partially measurable state of the systems. The online state estimator 13 takes as input the measurements and estimates the state, called state estimates, trying to approximate the part of the state that is not present in the measurements. The policy 14, is a controller parameterized by some policy parameters. The policy 14 takes as input the state estimates and outputs the control signal in order to control the real system 11. Examples of a policy can be a gaussian process, a neural network, a deep neural network, a Proportional-Integral-Differential (PID) controller, etc.

The controller 100 includes an interface controller (hardware circuit), a processor, and a memory unit. The processor may be one or more than one processor units, and the memory unit may be memory devices, a data storage device or the like. The interface controller can be an interface circuit, which may include analogue/digital (A/D) and digital/analogue (D/A) converters to make signal/data communication with the sensors 12 arranged in the system module 10. Further, the interface controller may include a memory to store data to be used by the A/D or D/A converters. The sensors 12 are arranged in the system module 10 to measure stats of the real system 11.

The controller 100 composed of a model learning module 1300 and of a policy learning module 1400 represents some embodiments of the present invention. During policy execution in the system module 10, the measurements and the control signal are collected as data. These data are processed by the offline state estimator 131, the offline state estimator filters the data and outputs the offline state estimates. The offline state estimates approximate the state of the real system 11 which are not accessible directly because the sensor 12 outputs only the measurements. Example of offline state estimators 131 can be acausal filters, Kalman smoother, central difference velocity approximators, etc. The model learning program 132 takes as input the offline state estimates and learns a system model that emulates the real system. The model learning program 132 could be a gaussian process, a neural network, a physical model or any machine learning model. The output of the model learning program 132 is a system model 141 that approximate the real system 11.

In the policy learning module 1400, the policy to control the system is learned. The components 141, 142, 143 of the policy learning module 1400 approximate the components, the real system 11, the sensor 12 and the online state estimator 13 of the system module 10, respectively. The component 141 may be a system model 141 that is configured to approximate the real system 11, the sensor model 142 approximates the sensor 12, the component 143 approximates the online state estimator 13 and the policy optimization 144 is configured to optimize the policy parameters that defines the policy block 14 in the system module 10. The system model 141 is configured to approximate the real system 11 and when a control signal is applied to the system model 141, the particle states are generated by the policy optimization module 144. The particle states generated by the system model 141 are an approximation of the state of the real system 11. The model of the sensor 142 from the particle states computes the particle measurements that are an approximation of the measurements in the system module 10 and the model of the online state estimator 143 from the particle measurements and previous particles online estimates computes the online estimates. The online estimates are an approximation of the state estimates in the system module 10. The policy optimization block 144 takes as input the particle online estimates and the particle measurements and learns the optimal policy parameters for the policy 14. During learning (training) the policy optimization 144 generates control signals that are sent to the system model 141, when the learning is finished the policy parameters can be used to define the policy 14 in order to control the real system.

Figure 1B:
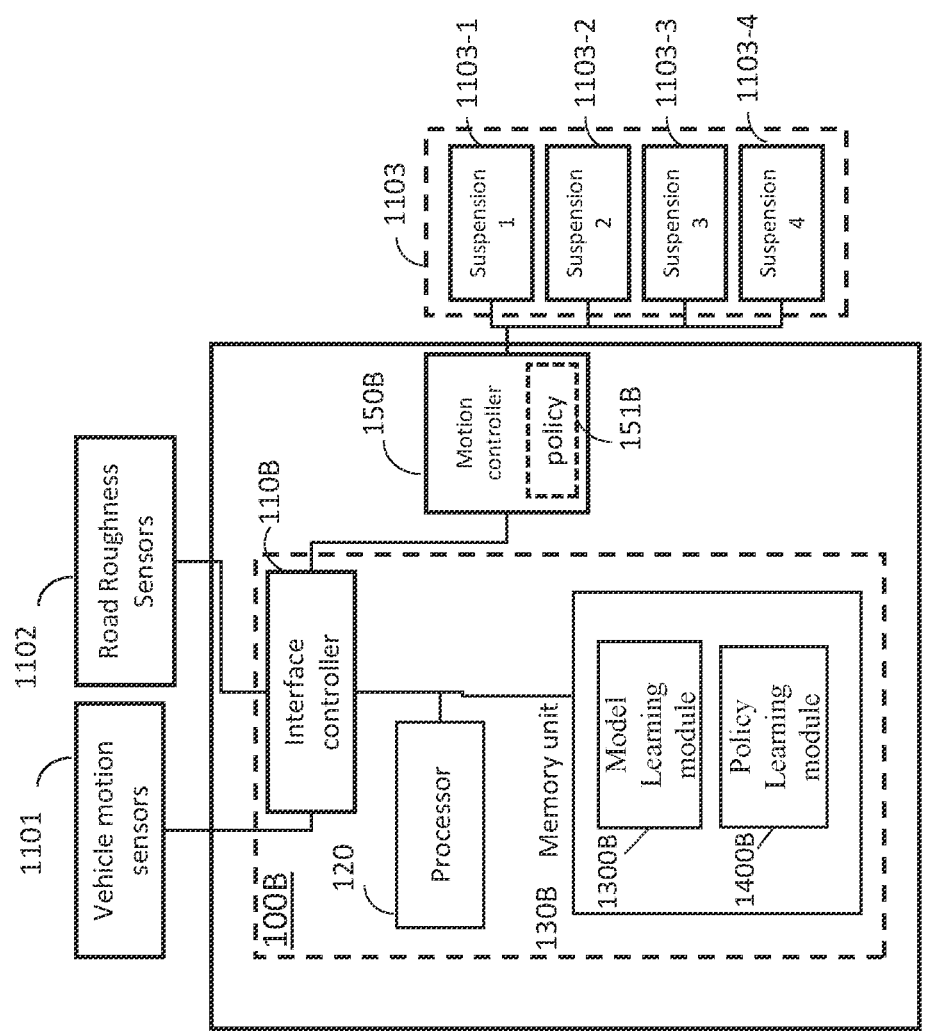
FIG. 1B shows a block diagram illustrating a controller configured to control a suspension system of a vehicle, according to embodiments of the present invention.

FIG. 1B shows a block diagram illustrating a vehicle motion controller 100B configured to control a motion system of a vehicle according to embodiments of the present invention. In this case, the controller 100 can be applied to a vehicle control system 100B for controlling motions of a vehicle. The vehicle control system 100B, which includes a model learning module and a policy learning module, is connected to a motion controller of the vehicle and vehicle motion sensors that measure the motions of the vehicle, wherein the control system generates policy parameters based on measurement data of the motion, wherein the control system provides the policy parameters to a motion controller of the vehicle to update a policy unit of the motion controller.

The vehicle motion controller 100B may include an interface controller 110B, a processor 120, and a memory unit 130B. The processor 120 may be one or more than one processor units, and the memory unit 130B may be memory devices, a data storage device or the like. The interface controller 110B can be an interface circuit, which may include analogue/digital (A/D) and digital/analogue (D/A) converters to make signal/data communication with vehicle motion sensors 1101, road roughness sensors 1102, and a motion controller 150B of a vehicle. Further, the interface controller may include a memory to store data to be used by the A/D or D/A converters. The vehicle motion sensors 1101 and road roughness sensors 1102 are arranged on the vehicle to measure motion stats of the vehicle. The vehicle includes a motion controller device/circuit that includes a policy unit 151B to generate action parameters to control a suspension system 1103 that controls suspension devices 1103-1, 1103-2, 1103-3 and 1103-4. The suspension devices may be 1103-1, 1103-2, 1103-3, . . . 1103-#N, according to the number of whiles. For instance, the vehicle motion sensors 1101 may include acceleration sensors, positioning sensors or global positioning system (GPS) device to measure motion states of the vehicle. The road roughness sensors 1102 may include acceleration sensors, positioning sensors or the like.

The interface controller 110B is also connected to vehicle sensors 1101 that measure states of the motion of the vehicle. Further, the interface controller 110B may be connected to road roughness sensors 1102 mounted on the vehicle to acquire information of the roughness of a road on which the vehicle is driving. In some case, when the vehicle is an electrical drive care, the motion controller 150B may control individual electric motors that drive the whiles of the vehicle. In some case, the motion controller 150B may control the rotations of individual whiles to smoothly accelerate or safely decelerate the vehicle in response to the policy parameters generated from the policy learning module 1400B. Further, depending to the design of vehicle driving operations, the motion controller 150B may control the angles of the whiles in response to the policy parameters generated from the policy learning module 1400B.

The memory unit 130B can store computer-executable program modules including a model learning module 1300B and a policy learning module 1400B. The processor 120 is configured to perform steps of the program modules 1300B and 1400B. In this case, the steps may include offline-modeling to generate offline-learning states based on the action state (motion states) of the vehicle and measurement state from the vehicle motion sensors 1101, the road roughness sensors 1102 or the combination of the vehicle motion sensors 1101, the road roughness sensors 1102 using the model learning module 1300B. The steps further perform providing the offline states to the policy learning module 1400B to generate policy parameters and updating the policy 151 of the motion controller 150B of the vehicle to operate the actuators or suspension system 1103 based on the policy parameters.

Figure 1C:
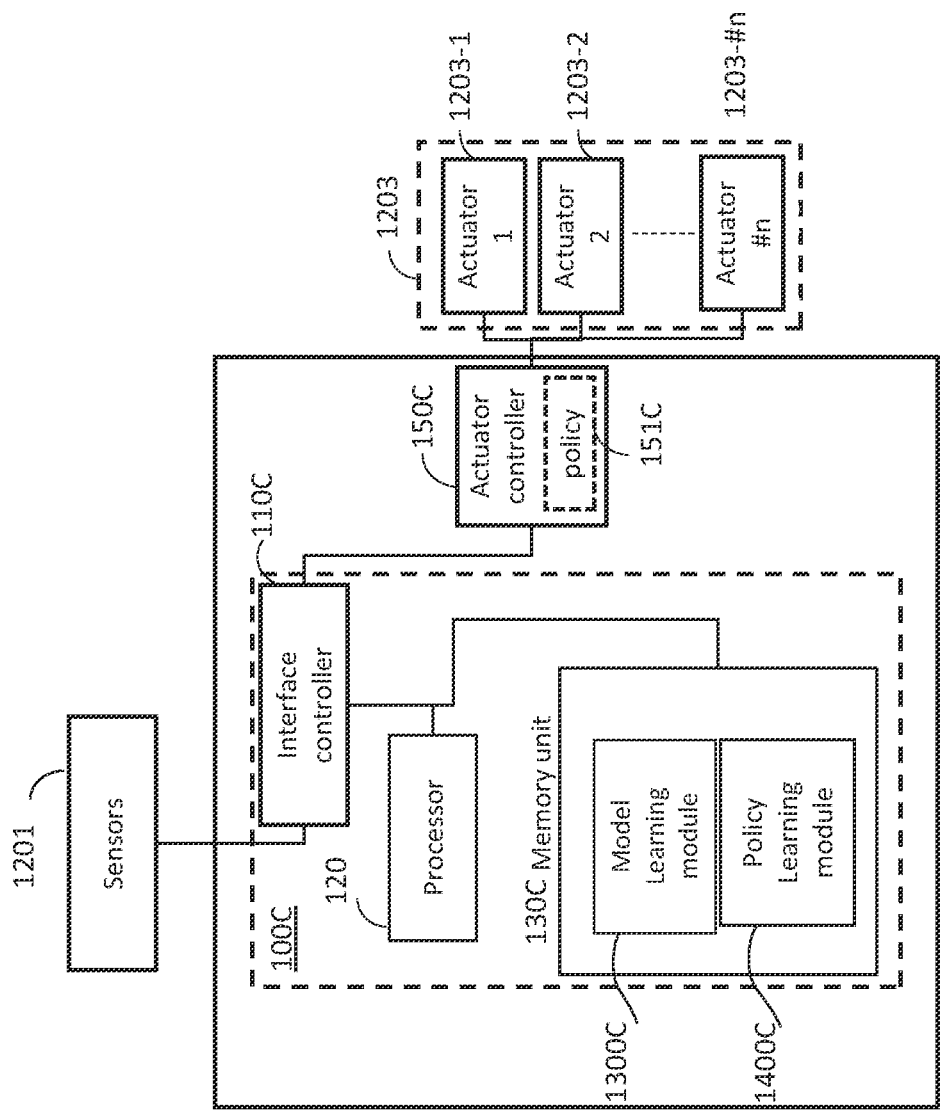
FIG. 1C shows a block diagram illustrating a controller configured to control an actuator system of a robot, according to embodiments of the present invention.

FIG. 1C shows a block diagram illustrating a robotic control system 100C for controlling motions of a robot according to embodiments of the present invention. The robotic control system 100C is configured to control an actuator system 1203 of the robot.

In this case, the controller 100 can be applied to the robotic control system 100C for controlling motions of the robot. The robotic control system 100C, which includes a model learning module 1300C and a policy learning module 1400C, is connected to an actuator controller 150C of the robot and sensors 1201 that measure the motions of the robot, wherein the robotic control system 100C generates policy parameters based on measurement data of the motion, wherein the control system 100C provides the policy parameters to the actuator controller 150C of the robot to update a policy unit 151C of the actuator controller.

The robotic control system 100C may include an interface controller 110C, a processor 120, and a memory unit 130C. The processor 120 may be one or more than one processor units, and the memory unit 130C may be memory devices, a data storage device or the like. The interface controller 110C can be an interface circuit, which may include analogue/digital (A/D) and digital/analogue (D/A) converters to make signal/data communication with sensors 1201 and a motion controller 150C of the robot. Further, the interface controller 110C may include a memory to store data to be used by the A/D or D/A converters. The sensors 1201 are arranged at joints of the robot (robot arm(s)) or picking object mechanism (e. g. fingers) to measure the stats of the robot. The robot includes an actuator controller (device/circuit) 150C that includes a policy unit 151C to generate action parameters to control a robotic system 1203 that controls robot arms, handling mechanism or combinations of the arms and the handling mechanism 1203-1, 1203-2, 1203-3 and 1203-#N, according to the number of joints or handling fingers. For instance, the sensors 1201 may include acceleration sensors, positioning sensors or global positioning system (GPS) device to measure motion states of the vehicle. The sensors 1202 may include acceleration sensors, positioning sensors or the like.

The interface controller 110C is also connected to the sensors 1201 that measure/acquire states of the motion of the robot mounted on the robot. In some case, when the actuators are electrical motors, the actuator controller 150C may control individual electric motors that drive the angles of the robot arms or handling of the object by the handling mechanism. In some case, the actuator controller 150C may control the rotations of individual motors arranged in the arms to smoothly accelerate or safely decelerate the motion of the robot in response to the policy parameters generated from the policy learning module 1400C. Further, depending to the design of the object handling mechanism, the actuator controller 150C may control the lengths of the actuators in response to the policy parameters generated from the policy learning module 1400C.

The memory unit 130C can store computer-executable program modules including a model learning module 1300C and a policy learning module 1400C. The processor 120 is configured to perform steps of the program modules 1300C and 1400C. In this case, the steps may include offline-modeling to generate offline-learning states based on the action state (motion states) of the robot and measurement state from the sensors 1201 using the model learning module 1300C. The steps further perform providing the offline states to the policy learning module 1400C to generate policy parameters and updating the policy 151C of the motion controller 150C of the robot to operate the actuator system 1203 based on the policy parameters.

Figure 1D:
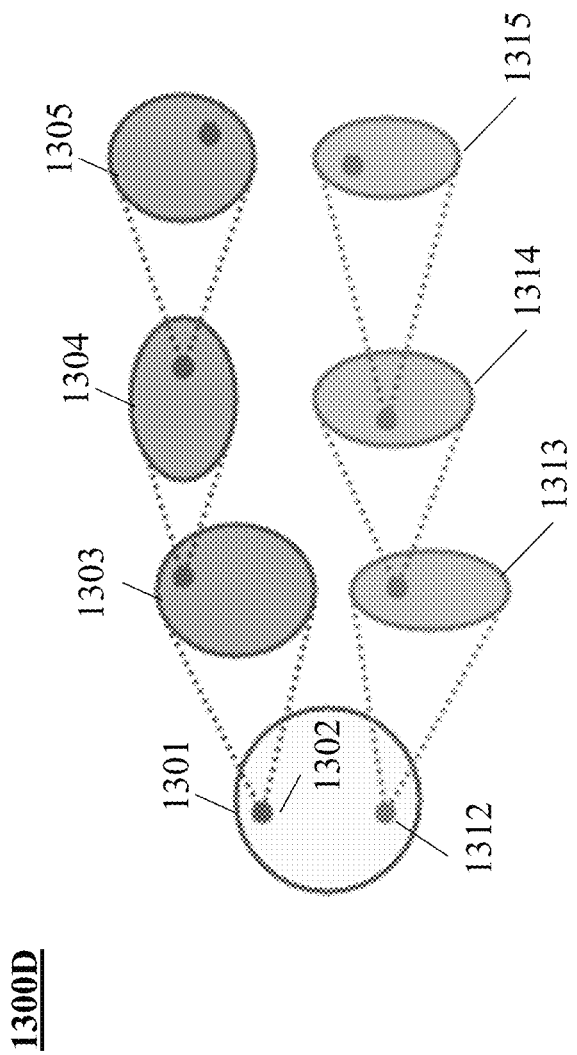
FIG. 1D shows a schematic diagram illustrating a Particle-based method for policy optimization to control a system, according to embodiments of the present invention.

FIG. 1D shows a schematic diagram illustrating a Particle-based method for policy optimization to control a system, according to embodiments of the present invention.

The component 1301 represents a schematic of the initial state distribution of the system. The components 1302 and 1312 are named particles and are examples of the initial conditions sampled accordingly to the initial state distribution. The particles state evolution of particle 1302 is represented by 1303, 1304, 1305. Starting from 1302 the system model estimates the distribution of the particle state at the following steps represented by 1303 at the first step, by 1304 at the second step and by 1305 at the third step. The state evolution continues for how many steps the simulation is decided to last. Analogously, the particles state evolution of particle 1312 is represented by 1313, 1314, 1315.

According to the present invention, some embodiment are described as follows. We state the general problem of model-based policy gradient methods, and present modelling approaches of dynamical systems with GPs. Further, we present MC-PILCO, our proposed algorithm for fully measurable systems, detailing the policy optimization and model learning techniques adopted. We analyze several aspects affecting the performance of MC-PILCO, such as the cost shape, dropout, and the kernel choice. In addition, we compare MC-PILCO with PILCO and Black-DROPS using a simulated cart-pole benchmark system, test the MC-PILCO performance with a simulated UR5 robot, and also test the advantages of the particle-based approach when dealing with different distributions of the initial conditions. We the present the extension of the algorithm MCPILCO to systems with partially measurable state, the algorithm is now called MC-PILCO4PMS. Experiments will be shown as examples, the controllers according to the present invention are applied to a real Furuta pendulum and a ball-and-plate system.

Model-Based Policy Gradient

In this section, we introduce the standard framework considered in model-based policy gradient RL methods Consider the discrete-time system described by the unknown transition function $f(\cdot)$, $$x_{t+1} = f(x_t, u_t) + w_t,$$

where, at each time step t, $x_t \in \mathbb{R}^{d_x}$ and $u_t \in \mathbb{R}^{d_u}$ are, respectively, the state and the inputs of the system, while $w_t \sim \mathcal{N}(0, \Sigma_w)$ is an independent Gaussian random variable modeling additive noise. The cost function $c(x_t)$ is defined to characterize the immediate penalty for being in state $x_t$.

Inputs are chosen according to a policy function $\pi: x \mapsto u$ that depends on the parameter vector $\theta$.

The objective is to find the policy that minimizes the expected cumulative cost over a finite number of time steps T, i.e., $$J(\theta) = \sum_{t=0}^{T} E_{x_t}[c(x_t)], \quad (1)$$

with an initial state distributed according to a given $p(x_0)$.

A model-based approach for learning a policy consists, generally, of the succession of several trials; i.e. attempts to solve the desired task. Each trial consists of three main phases:

Model Learning: the data collected from all the previous interactions are used to build a model of the system dynamics (at the first iteration data are collected applying possibly random exploratory controls);

Policy Update: the policy is optimized in order to minimize the cost $J(\theta)$ according to the current model;

Policy Execution: the current optimized policy is applied to the system and the data are stored for model improvement.

Model-based policy gradient methods use the learned model to predict the state evolution when the current policy is applied. These predictions are used to estimate $J(\theta)$ and its gradient $\nabla_\theta J$, in order to update the policy parameters $\theta$ following a gradient-descent approach.

GPR and One-Step-Ahead Predictions

In this section we discuss how to use Gaussian Process Regression (GPR) for model learning. We focus on three aspects: some background notions about GPR, the description of the model prediction for one-step-ahead, and finally, we discuss long term predictions, focusing on two possible strategies, namely, moment matching and particle-based method.

A common strategy with GPR-based approaches consists of modeling the evolution of each state dimension with a distinct GP. Let's denote by $\Delta_t^{(i)} = x_{t+1}^{(i)} - x_t^{(i)}$ the difference between the value of the i-th component at time t+1 and t, and by $y_t^{(i)}$ the noisy measurement of $\Delta_t^{(i)}$ with $i \in \{1, \ldots, d_x\}$. Moreover, let $\tilde{x}_t = [x_t, u_t]$ be the vector that includes the state and the input at time t, also called the GP input. Then, given the data $D = (\tilde{X}, y^{(i)})$, where $y^{(i)} = [y_{t_1}^{(i)}, \ldots, y_{t_n}^{(i)}]^T$ is a vector of n output measurements, and $\tilde{X} = \{\tilde{x}_{t_1}, \ldots, \tilde{x}_{t_n}\}$ is the set of GP inputs, GPR assumes the following probabilistic model, for each state dimension, $$y^{(i)} = \begin{bmatrix} h^{(i)}(\tilde{x}_{t_1}) \\ \vdots \\ h^{(i)}(\tilde{x}_{t_n}) \end{bmatrix} + \begin{bmatrix} e_{t_1}^{(i)} \\ \vdots \\ e_{t_n}^{(i)} \end{bmatrix} = h^{(i)}(\tilde{X}) + e^{(i)},$$

where $e^{(i)}$ is a zero-mean Gaussian i.i.d. noise with standard deviation $\sigma_i$, and $h^i(\cdot)$ is an unknown function modeled a priori as a zero-mean Gaussian Process and $i \in \{1, \ldots d_x\}$. In particular, we have $h^{(i)} \sim \mathcal{N}(0, K_i(\tilde{X}, \tilde{X}))$, with the a priori covariance matrix $K_i(\tilde{X}, \tilde{X}) \in \mathbb{R}^{n \times n}$ defined element-wise through a kernel function $k_i(\cdot,\cdot)$, namely, the element in j-th row and k-th column is given by $k_i(\tilde{x}_{t_j}, \tilde{x}_{t_k})$. A crucial aspect in GPR is the kernel choice. The kernel function encodes prior assumptions about the process. One of the most common choices for continuous functions is the SE kernel, defined as $$k_{SE}(\tilde{x}_{t_j}, \tilde{x}_{t_k}) := \lambda^2 e^{-\|x_{t_j} - x_{t_k}\|^2 \Lambda^{-1}}, \quad (2)$$

where the scaling factor $\lambda$ and the matrix $\Lambda$ are kernel hyperparameters which can be estimated by marginal likelihood maximization. Typically, $\Lambda$ is assumed to be diagonal, with the diagonal elements named lengthscales.

Remarkably, the posterior distribution of $h^{(i)}(\cdot)$ can be computed in closed form. Let $\tilde{x}_t$ be a general GP input at time t. Then, the distribution of $\hat{\Delta}_t^{(i)}$, the estimate of $\Delta_t^{(i)}$, is Gaussian with mean and variance given by $$E[\hat{\Delta}_t^{(i)}] = k_i(\tilde{x}_t, \tilde{X})\Gamma_i^{-1} y^{(i)}, \quad (3)$$

$$\text{var}[\hat{\Delta}_t^{(i)}] = k_i(\tilde{x}_t, \tilde{x}_t) - k_i(\tilde{x}_t, \tilde{X})\Gamma_i^{-1} k_i^T(\tilde{x}_t, \tilde{X}), \quad (4)$$

with $\Gamma_i$ and $k_i(\tilde{x}_t, \tilde{X})$ defined as $$\Gamma_i = (K_i(\tilde{X}, \tilde{X}) + \sigma_i^2 I)$$

$$k_i(\tilde{x}_t, \tilde{X}) = [k_i(\tilde{x}_t, \tilde{x}_{t_1}), \ldots, k_i(\tilde{x}_t, \tilde{x}_{t_n})].$$

Recalling that the evolution of each state dimension is modeled with a distinct GP, and assuming that the GPs are conditionally independent given the current GP input $\tilde{x}_t$, the posterior distribution for the estimated state at time t+1 is $$p(\hat{x}_{t+1} | \tilde{x}_t, \mathcal{D}) \sim (\mathcal{N}(\mu_{t+1}, \Sigma_{t+1}), \quad (5)$$

where $$\mu_{t+1} = x_t + [E[\hat{\Delta}_t^{(1)}], \ldots, E[\hat{\Delta}_t^{(d_x)}]]^T, \quad (6)$$

$$\Sigma_{t+1} = \text{diag}([\text{var}[\hat{\Delta}_t^{(1)}], \ldots, \text{var}[\hat{\Delta}_t^{(d_x)}]]). \quad (7)$$

Long-Term Predictions With GP Dynamical Models

In MBRL, the policy $\pi_\theta$ is evaluated and improved based on long-term predictions of the state evolution: $p(\hat{x}_1), \ldots, p(\hat{x}_T)$. The exact computation of these quantities entails the application of the one-step-ahead GP models in cascade, considering the propagation of the uncertainty. More precisely, starting from a given initial distribution $p(x_0)$, at each time step t, the next state distribution is obtained by marginalizing (5) over $p(\hat{x}_t)$, that is, $$p(\hat{x}_{t+1}) = \int p(\hat{x}_{t+1} | \hat{x}_t, \pi_\theta(\hat{x}_t)D) p(\hat{x}_t) d\hat{x}_t. \quad (8)$$

Unfortunately, computing the exact predicted distribution in (8) is not tractable. There are different ways to solve it approximately, here we discuss two main approaches: moment matching, adopted by PILCO, and a particle-based method, the strategy followed in this work.

Moment Matching

Assuming that the GP models use only the SE kernel as a prior covariance, and considering a normal initial state distribution $x_0 : N(\mu_0, \Sigma_0)$, the first and the second moments of $p(\hat{x}_1)$ can be computed in closed form. Then, the distribution $p(\hat{x}_1)$ is approximated to be a Gaussian distribution, whose mean and variance correspond to the moments computed previously. Finally, the subsequent probability distributions are computed iterating the procedure for each time step of the prediction horizon. For details about the computation of the first and second moments. Moment matching offers the advantage of providing a closed form solution for handling uncertainty propagation through the GP dynamics model. Thus, in this setting, it is possible to analytically compute the policy gradient from long-term predictions. However, as already mentioned above, the Gaussian approximation performed in moment matching is also the cause of two main weaknesses: (i) The computation of the two moments has been performed assuming the use of SE kernels, which might lead to poor generalization properties in data that have not been seen during training. (ii) Moment matching allows modeling only unimodal distributions, which might be a too restrictive approximation of the real system behavior.

Particle-Based Method

The integral in (8) can be approximated relying on Monte Carlo approaches, in particular on particle-based methods. Specifically, M particles are sampled from the initial state distribution $p(x_0)$. Each one of the M particles is propagated using the one-step-ahead GP models (5). Let $x_t^{(m)}$ be the state of the m-th particle at time t, with m=1, ..., M. At time step t, the actual policy $\pi_\theta$ is evaluated to compute the associated control. The GP model provides the Gaussian distribution $p(x_{t+1}^{(m)}|x_t^{(m)}, \pi_\theta(x_t^{(m)}), D)$ from which $x_{t+1}^{(m)}$, the state of the particle at the next time step, is sampled. This process is iterated until a trajectory of length T is generated for each particle. The process is illustrated in FIG. 1D for the sake of clarity. The long-term distribution at each time step is approximated with the distribution of the particles. Notice that this approach does not impose any constraint on the choice of the kernel function and the initial state distribution. Moreover, no approximations on the distribution $p(\hat{x}_t)$ are made. Therefore, particle-based methods do not suffer from the problems seen in moment matching, at the cost of being more computationally heavy. Specifically, the computation of (5) entails the computation of (3) and (4), which are, respectively, the mean and the variance of the delta states. Regarding the computational complexity, it can be noted that $\Gamma_i^{-1} y^{(i)}$ is computed a single time offline during the training of the GP model (same computation is needed in the moment matching case), and the number of operations required to compute (3) is linear w.r.t. the number of samples n. The computational bottleneck is the computation of (4), which is $O(n^2)$. Then, the cost of a single state prediction is $O(d_x n^2)$, leading to a total computational cost of $O(d_x M T n^2)$. Depending on the complexity of the system dynamics, the number of particles necessary to obtain a good approximation might be high, determining a considerable computational burden. Nevertheless, the computational burden can be substantially mitigated via GPU parallel computing, due to the possibility of computing the evolution of each particle in parallel.

MC-PILCO

In the following, we present the proposed algorithm for fully measurable systems. MC-PILCO relies on GPR for model learning and follows a Monte Carlo sampling method to estimate the expected cumulative cost from particles trajectories propagated through the learned model. We exploit the reparameterization trick to obtain the policy gradient from the sampled particles and optimize the policy. This way of proceeding is very flexible, and allows using any kind of kernels for the GPs, as well as providing more reliable approximations of the system's behaviour. MC-PILCO, in broad terms, consists of the iteration of three main steps, namely, update the GP models, update the policy parameters, and execute the policy on the system. In its turn, the policy update is composed of three steps, iterated for a maximum of $N_{opt}$ times:

- simulate the evolution of M particles, based on the current $\pi_\theta$ and on the GP models learned from the previously observed data;
- compute $\hat{J}(\theta)$, an approximation of the expected cumulative cost, based on the evolution of the M particles;
- update the policy parameters $\theta$ based on $\nabla_\theta \hat{J}(\theta)$, the gradient of $\hat{J}(\theta)$ w.r.t. $\theta$, computed by backpropagation.

In the following, we discuss in more depth the model learning step and the policy optimization step.

Model Learning Program

Here, we describe the model learning framework considered in MC-PILCO. We begin by showing the proposed one-step-ahead prediction model. Then, we discuss the choice of the kernel functions. Finally, we briefly discuss the model's hyperparameters optimization and the strategy adopted to reduce the computational cost.

One-Step-Ahead Model

Let the state be defined as $x_t = [q_t^T, \dot{q}_t^T]^T$, where $q_t \in$ $$R^{\frac{d_x}{2}}$$

is the vector of the generalized coordinates of the system at time step t, and, $\dot{q}_t$ represents the derivative of $q_t$ w.r.t. time. MC-PILCO adopts a one-step-ahead model, hereafter denoted as speed-integration dynamical model, which exploits the intrinsic correlation between the state components q and $\dot{q}$. Indeed, when considering a sufficiently small sampling time $T_s$ (small w.r.t. the application), it is reasonable to assume constant accelerations between two consecutive time-steps, obtaining the following evolution of $q_t$, $$q_{t+1} = q_t + T_s \dot{q}_t + \frac{T_s}{2}(\dot{q}_{t+1} - \dot{q}_t). \quad (9)$$

Let $I_q$ (respectively $I_{\dot{q}}$) be the ordered set of the dimension indices of the state x associated with q (respectively $\dot{q}$). The proposed speed-integration model learns only $d_x/2$ GPs, each of which models the evolution of a distinct velocity component $\Delta_t^{(i_k)}$, with $i_k \in I_{\dot{q}}$. Then, the evolution of the position change, $\Delta_t^{(i_k)}$, with $i_k \in I_q$ is computed according to (9) and the predicted change in velocity. Many previous MBRL algorithms, adopted the standard model described above, and hereafter denoted as full-state dynamical model. The full-state model predicts the change of each state component with a distinct and independent GP. Doing so, the evolution of each state dimension is assumed to be conditionally independent given the current GP input, and it is necessary to learn a number of GPs equal to the state dimension $d_x$. Then, compared to the full-state model, the proposed speed-integration model halves the number of GPs to be learned, decreasing the cost of a state prediction to $$O\left(\frac{d_x}{2} M T n^2\right).$$

Nevertheless, this approach is based on a constant acceleration assumption, and works properly only when considering small enough sampling times. However, MC-PILCO can use also the standard full-state model, which might be more effective when sampling time is too high.

Kernel Functions

Regardless of the GP dynamical model structure adopted, one of the advantages of the particle-based policy optimization method is the possibility of choosing any kernel functions without restrictions. Hence, we considered different kernel functions as examples to model the evolution of physical systems. But the reader can consider a custom kernel function appropriate for his application.

Squared exponential (SE). The SE kernel described in (2) represents the standard choice adopted in many different works.

SE+Polynomial (SE+$P^{(d)}$). Recalling that the sum of kernels is still a kernel, we considered also a kernel given by the sum of a SE and a polynomial kernel. In particular, we used the Multiplicative Polynomial (MP)

kernel, which is a refinement of the standard polynomial kernel. The MP kernel of degree d is defined as the product of d linear kernels, namely, $$k_P^{(d)}(\tilde{x}_{t_j}, \tilde{x}_{t_k}) := \prod_{r=1}^{d} \left( \sigma_{P_r}^2 + \tilde{x}_{t_j}^T \Sigma_{P_r} \tilde{x}_{t_k} \right)$$

where the $\Sigma_{P_r} > 0$ matrices are distinct diagonal matrices. The diagonal elements of the $\Sigma_{P_r}$, together with the $\sigma_{P_r}^2$ elements are the kernel hyperparameters. The resulting kernel is $$k_{SE+P^{(d)}}(\tilde{x}_{t_j}, \tilde{x}_{t_k}) = k_{SE}(\tilde{x}_{t_j}, \tilde{x}_{t_k}) + k_P^{(d)}(\tilde{x}_{t_j}, \tilde{x}_{t_k}) \qquad (10)$$

The idea motivating this choice is the following: the MP kernel allows capturing possible modes of the system that are polynomial functions in $\tilde{x}$, which are typical in mechanical systems, while the SE kernel models more complex behaviors not captured by the polynomial kernel.

Semi-Parametrical (SP). When prior knowledge about the system dynamics is available, for example given by physics first principles, the so called physically inspired (PI) kernel can be derived. The PI kernel is a linear kernel defined on suitable basis functions $\phi(\tilde{x})$. More precisely, $\phi(\tilde{x}) \in R^{d_\phi}$ is a, possibly nonlinear, transformation of the GP input $\tilde{x}$ determined by the physical model. Then we have $$k_{PI}(\tilde{x}_{t_j}, \tilde{x}_{t_k}) = \phi^T(\tilde{x}_{t_j}) \Sigma_{PI} \phi(\tilde{x}_{t_k}),$$

where $\Sigma_{PI}$ is a $d_\phi \times d_\phi$ positive-definite matrix, whose elements are the $k_{PI}$ hyperparameters; to limit the number of hyperparameters, a standard choice consists in considering $\Sigma_{PI}$ to be diagonal. To compensate possible inaccuracies of the physical model, it is common to combine $k_{PI}$ with an SE kernel, obtaining so called semi-parametric kernels, expressed as $$k_{SP}(\tilde{x}_{t_j}, \tilde{x}_{t_k}) = k_{PI}(\tilde{x}_{t_j}, \tilde{x}_{t_k}) + k_{SE}(\tilde{x}_{t_j}, \tilde{x}_{t_k}).$$

The rationale behind this kernel is the following: $k_{PI}$ encodes the prior information given by the physics, and $k_{SE}$ compensates for the dynamical components unmodeled in $k_{PI}$.

Model Optimization and Reduction Techniques

In MC-PILCO, the GP hyperparameters are optimized by maximizing the marginal likelihood (ML) of the training samples. Previously, we saw that the computational cost of a particle prediction scales with the square of the number of samples n, leading to a considerable computational burden when n is high. In this context, it is essential to implement a strategy to limit the computational burden of a prediction. Several solutions have been proposed in the literature. We implemented a procedure, where the authors proposed an online importance sampling strategy. After optimizing the GP hyperparameters by ML maximization, the samples in D are downsampled to a subset $D_r = (\tilde{X}_r, y_r^{(i)})$, which is then used to compute the predictions. This procedure first initializes $D_r$ with the first sample in D, then, it computes iteratively the GP estimates of all the remaining samples in D, using $D_r$ as training samples. Each sample in D is either added to $D_r$ if the uncertainty of the estimate is higher than a threshold $\beta^{(i)}$ or it is discarded. The GP estimator is updated every time a sample is added to $D_r$. The trade-off between the reduction of the computational complexity and the severity of the approximation introduced is regulated by tuning $\beta^{(i)}$. The higher the $\beta^{(i)}$, the smaller the number of samples in $D_r$. On the other hand, using values of $\beta^{(i)}$ too high might compromise the accuracy of GP predictions.

Policy Optimization Program

Here, we present the policy optimization strategy adopted in MC-PILCO. We start by describing the general-purpose policy structure considered. Later, we show how to exploit backpropagation and the reparameterization trick to estimate the policy gradient from particle-based long-term predictions. Finally, we explain how to implement dropout in this framework.

Policy Structure

In all the experiments presented in this work, we considered an RBF network policy with outputs limited by an hyperbolic tangent function, properly scaled. We call this function squashed-RBF-network, and it is defined as $$\pi_\theta(x) = u_{max} \tanh\left( \frac{1}{u_{max}} \sum_{i=1}^{n_b} w_i e^{\|a_i - x\|_{\Sigma_\pi}^2} \right).$$

(11)

The policy parameters are $\theta = \{w, A, \Sigma_\pi\}$, where $w = [w_1 \ldots w_{n_b}]$ and $A = \{a_1 \ldots a_{n_b}\}$ are, respectively, the weights and the centers of the Gaussian basis functions, while $\Sigma_\pi$ determines the shape of the Gaussian basis functions; in all experiments we assumed $\Sigma_\pi$ to be diagonal. The maximum control action $u_{max}$ is constant and chosen depending on the system to control. It is worth mentioning that MC-PILCO can deal with any differentiable policy, so more complex functions, such as deep neural networks could be considered too.

Computation of the Gradient

MC-PILCO derives the policy gradient by applying the reparameterization trick to the computation of the estimated expected cumulative cost in (1), obtained relying on Monte Carlo sampling. Given a control policy $\pi_\theta$ and an initial state distribution $p(x_0)$, the evolution of a sufficiently high number of particles is predicted as described above. Thus, the sample mean of the costs incurred by the particles at time step t approximates each $E_{x_t}[c(x_t)]$. Specifically, let $x_t^{(m)}$ be the state of the m-th particle at time t, with m=1, ..., M and t=0, ..., T. The Monte Carlo estimate of the expected cumulative cost is computed with the following expression, $$\hat{J}(\theta) = \sum_{t=0}^{T} \left( \frac{1}{M} \sum_{m=1}^{M} c(x_t^{(m)}) \right). \qquad (12)$$

To compute the gradient of (12) w.r.t. the policy parameters, we use the reparameterization trick to differentiate through the stochastic operations. The evolution of every particle $x_t^{(m)}$ at the next time step is sampled from the normal distribution $p(x_{t+1}^{(m)}|x_t^{(m)}, \pi_\theta(x_t^{(m)}), \mathcal{D}) \sim \mathcal{N}(\mu_{t+1}, \Sigma_{t+1})$, defined in (6)-(7). However, instead of sampling directly from $N(\mu_{t+1}, \Sigma_{t+1})$, the reparameterization trick samples a point $\varepsilon$ from a zero-mean and unit-variance normal distribution of proper dimensions. Then, it maps this point to the desired distribution as $x_{t+1}^{(m)} = \mu_{t+1} + L_{t+1}\varepsilon$, where $L_{t+1}$ is the Cholesky decomposition of $\Sigma_{t+1}$, namely, $L_{t+1}L_{t+1}^T = \Sigma_{t+1}$. Now, it is possible to differentiate $x_{t-1}^{(m)}$ w.r.t. the distribution parameters, and $\nabla_\theta \hat{J}$ is computed simply by backpropagation. We update the policy parameters using the Adam solver; we will denote the Adam step size with $\alpha_{lr}$.

Dropout

To improve exploration in the parameters $\theta$ and increase the ability of escaping from local minima during policy optimization, we considered the use of dropout. The adopted procedure is described assuming that the policy is the squashed-RBF-network in (11); similar considerations can be applied to different policy functions. When dropout is applied to the policy in (11) at each evaluation of the policy function, the policy weights w are randomly dropped with probability $p_d$. This operation is performed by scaling each weight $w_i$ with a random variable $r_i \sim \text{Bernoulli}(1-p_d)$, where Bernoulli$(1-p_d)$ denotes a Bernoulli distribution, assuming value $1/(1-p_d)$ with probability $1-p_d$, and 0 with probability $p_d$. This operation is equivalent to defining a probability distribution for w, obtaining a parameterized stochastic policy. In particular, the distribution of each $w_i$ can be approximated with a bimodal distribution, defined by the sum of two properly scaled Gaussian distributions with infinitely small variance $\xi^2$, namely, $$p_d \mathcal{N}(0, \xi^2) + (1-p_d) \mathcal{N}\left(\frac{w_i}{1-p_d}, \xi^2\right).$$

The use of a stochastic policy during policy optimization allows increasing the entropy of the particles' distribution. This property increments the probability of visiting low-cost regions and escaping from local minima. In addition, we also verified that dropout can mitigate issues related to exploding gradients. This is probably due to the fact that the average of several different values of w is used to compute the gradient and not a single value of w, i.e., different policy functions are used, obtaining a regularization of the gradient estimates.

By contrast, the use of a stochastic policy might affect the precision of the obtained solution due to the additional entropy. We also need to take in consideration that the final objective is to obtain a deterministic policy. For these reasons, we designed an heuristic scaling procedure to gradually decrease the dropout rate, $p_d$, until it equals 0. The scaling action is triggered by a monitoring signal s, defined from the statistics of the past history of $\hat{J}$. Define the cost change, $\Delta \hat{J}_j = \hat{J}(\theta_j) - \hat{J}(\theta_{j-1})$, where $\theta_j$ denotes the policy parameters at the j-th optimization step. Then, s is computed as a filtered version of the ratio between $E[\Delta \hat{J}_j]$ and $\sqrt{V[\hat{J}_j]}$, that are, respectively, the mean and the standard deviation of $\hat{J}_j$ computed with an Exponential Moving Average (EMA) filter. The expression of s at the j-th optimization step is the following:

$$E[\Delta \hat{J}_j] = \alpha_s E[\Delta \hat{J}_{j-1}] + (1-\alpha_s)\Delta \hat{J}_j, \quad (13)$$

$$V[\Delta \hat{J}_j] = \alpha_s \left(V[\Delta \hat{J}_{j-1}] + (1-\alpha_s)(\Delta \hat{J}_j - E[\Delta \hat{J}_{j-1}])^2\right),$$

$$s_j = \alpha_s s_{j-1} + (1-\alpha_s) \frac{E[\Delta \hat{J}_{j-1}]}{\sqrt{V[\Delta \hat{J}_j]}},$$

with $\alpha_s$ a coefficient of the exponential moving average filter, which determines the memory of the filter. At each iteration of the optimization procedure, the algorithm checks if the absolute value of the monitoring signal s in the last $n_s$ iterations is below the threshold $\sigma_s$, namely, $$[|s_{j-n_s}| \ldots |s_j|] < \sigma_s, \quad (14)$$

where < is an element-wise operator, and the condition in (14) is true if it is verified for all the elements. If the condition is verified, $p_d$ is decreased by the quantity $\Delta p_d$, and both the learning rate of the optimizer, $\alpha_{lr}$, and $\sigma_s$, are scaled by an arbitrary factor $\lambda_s$. Then, we have:

$$p_d = p_d - \Delta p_d \quad (15a)$$

$$\alpha_{lr} = \lambda_s \alpha_{lr} \quad (15b)$$

$$\sigma_s = \lambda_s \sigma_s \quad (15c)$$

The procedure is iterated as long as $$p_d \geq 0 \text{ and } \alpha_{lr} \geq \alpha_{lr_{min}}, \quad (16)$$

where $\alpha_{lr_{min}}$ is the minimum value of the learning rate.

The rationale behind this heuristic scaling procedure is the following. The $s_j$ signal is small, if $E[\Delta \hat{J}_j]$ is close to zero, or if $V[\Delta \hat{J}_j]$ is particularly high. The first case happens when the optimization reaches a minimum, while the high variance denotes that the particles' trajectories cross regions of the workspace where the uncertainty of the GPs predictions is high. In both cases, we are interested in testing the policy on the real system, in the first case to verify if the configuration reached solves the task, and in the second case to collect data where predictions are uncertain, and so to improve model accuracy. The algorithm MC-PILCO with dropout is summarized in pseudo-code in FIG. 1F.

We conclude the discussion about policy optimization by reporting in FIG. 1E, the optimization parameters used in all the proposed experiments, unless expressly stated otherwise. However, it is worth mentioning that some adaptation could be needed in other setups, depending on the problem considered.

Ablation Studies

In the following, we analyze several aspects affecting the performance of MC-PILCO, such as the shape of the cost function, the use of dropout, the kernel choice, and the probabilistic model adopted, namely, full-state or speed-integration dynamical model. The purpose of the analysis is to validate the choices made in the proposed algorithm MC-PILCO, and show the effect that they have in control of dynamical systems. MC-PILCO has been implemented in Python, exploiting the PyTorch library automatic differentiation functionalities; the code is publicly available. We considered the swing-up of a simulated cart-pole, a classical benchmark problem, to perform the ablation studies. The system and the experiments are described in the following. The physical properties of the system are the same as the system used in PILCO: the masses of both cart and pole are 0.5 [kg], the length of the pole is L=0.5 [m], and the coefficient of friction between cart and ground is 0.1. The state at each time step t is defined as $x_t = [p_t, \dot{p}_t, \theta_t, \dot{\theta}_t]$, where $p_t$ represents the position of the cart and $\theta_t$ the angle of the pole. The target states corresponding to the swing-up of the pendulum is given by $p^{des}=0$ [m] and $|\theta^{des}|=\pi$ [rad]. The downward stable equilibrium point is defined at $\theta_t=0$ [rad]. In order to avoid singularities due to the angles, $x_t$ is replaced in the algorithm with the state representation $\bar{x}_t = [p_t, \dot{p}_t, \dot{\theta}_t, \sin(\theta_t), \cos(\theta_t)]$. The control action is the force that pushes the cart horizontally. In all following experiments, we considered white measurement noise with standard deviation of $10^{-2}$, and as initial state distribution N([0,0,0,0], diag $([10^{-4}, 10^{-4}, 10^{-4}, 10^{-4}]))$. The sampling time is 0.05 seconds. The policy is a squashed-RBF-network with $n_b=200$ basis functions. It receives as input $\bar{x}_t$ and $u_{max}=10$ [N]. The number of particles has been set to M=400 in all the tests. The exploration trajectory is obtained by applying at each time step t a random control action sampled from U(−10,10). GP reduction techniques have not been adopted. The cost function optimized in MC-PILCO is the following, $$c(x_t) = 1 - \exp\left(-\left(\frac{|\theta_t| - \pi}{l_\theta}\right)^2 - \left(\frac{p_t}{l_p}\right)^2\right), \quad (17)$$

where $l_\theta$ and $l_p$ are named lengthscales. Notice that the lengthscales define the shape of $c(\cdot)$, the cost function goes to its maximum value more rapidly with small lengthscales. Therefore, higher cost is associated to the same distance from the target state with lower $l_\theta$ and $l_p$. The lower the lengthscale the more selective the cost function. The absolute value on $\theta_t$ is needed to allow different swing-up solutions to both the equivalent target angles of the pole $\pi$ and $-\pi$.

All the comparisons consist in a Monte Carlo study composed of 50 experiments. Every experiment is composed of 5 trials each of length 3 seconds. The random seed varies at each experiment, corresponding to different explorations and initialization of the policy, as well as different realizations of the measurement noise. The performance of the learned policies is evaluated using the cost, $$c^{pilco}(x_t) = 1 - \exp\left(-\frac{1}{2}\left(\frac{d_t}{0.25}\right)^2\right), \quad (18)$$

where $d_t^2 = p_t^2 + 2p_t L \sin(\theta_t) + 2L^2(1+\cos(\theta_t))$ is the squared distance between the tip of the pole and its position at the unstable equilibrium point with $p_t=0$ [m]. We introduce this cost in order to have a common metric to compare both different setups of MC-PILCO and other MBRL algorithms. For each trial, we report the median value and confidence interval defined by the 5-th and 95-th percentile of the cumulative cost obtained with $c^{pilco}(\cdot)$, as well as the success rates observed. We mark two values of the cumulative cost indicatively associated with an optimal and a sub-optimal swing-up, respectively. A solution is optimal if the pole oscillates only once before reaching the upwards equilibrium. A sub-optimal solution is when the pole oscillates twice. Finally, we label a trial as "success" if $|p_t|<0.1$ [m] and $170[\deg] \le |\theta_t| \le 190[\deg]$ $\forall t$ in the last second of the trial.

Cost Shaping

Figures 2A, 2B:
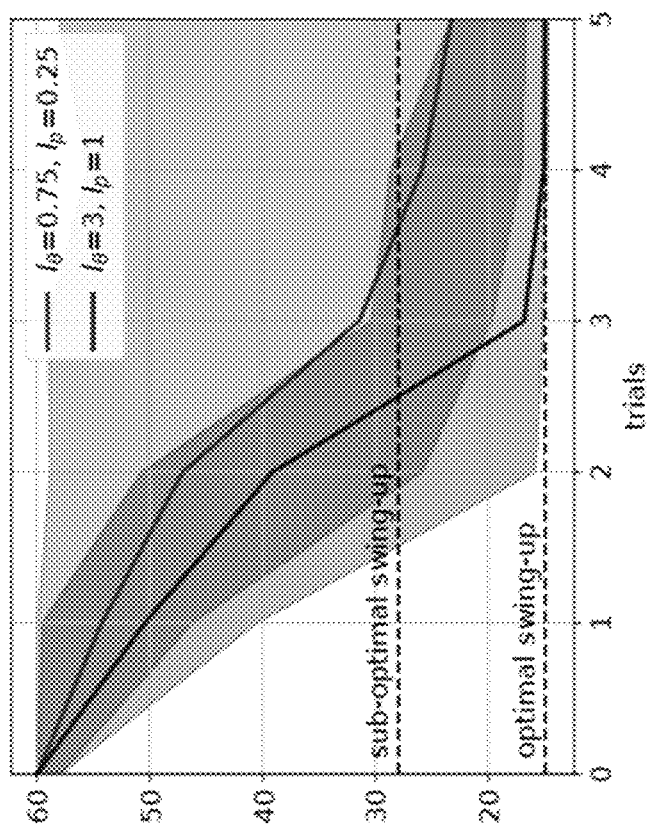
FIG. 2A shows a plot of the performance of an algorithm MC-PILCO at two different configurations of the parameters of the cost function, according to embodiments of the present invention.
FIG. 2B shows a table of the percentage of success rate of an algorithm MC-PILCO at two different configurations of the parameters of the cost function, according to embodiments of the present invention.

The first test regards the performance obtained varying the lengthscales of the cost function in (19). Reward shaping is a known important aspect of RL and here we will analyze it for MCPILCO. In FIG. 2A and FIG. 2B, we compare the evolution of the cumulative costs obtained with ($l_\theta=3$, $l_p=1$) and ($l_\theta=0.75$, $l_p=0.25$) and we report the observed success rates. The latter set of length-scales defines a more selective cost as the function shape becomes more skewed. In both cases, we adopted the speed-integration model with SE kernel and no dropout was used during policy optimization.

The results in FIG. 2A and FIG. 2B show that with ($l_\theta=3$, $l_p=1$) MC-PILCO performs better. Indeed, with ($l_\theta=0.75$, $l_p=0.25$) MC-PILCO manages to find a solution only in the 74% of the experiments, while with ($l_\theta=3$, $l_p=1$) success rate is 82%. Observing the cumulative costs, it is possible to appreciate also a difference in the quality of the policies learned in the two cases. The optimal swing-up can be found in the majority of the experiments only when using ($l_\theta=3$, $l_p=1$), while it has never been obtained with ($l_\theta=0.75$, $l_p=0.25$).

Figures 6A, 6B:
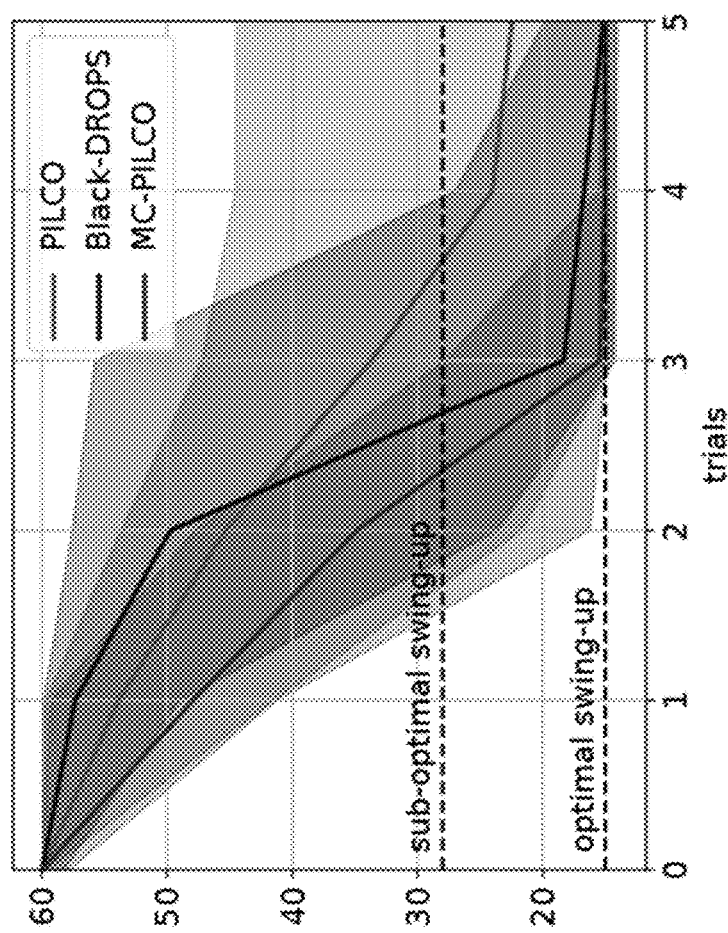
FIG. 6A shows a plot with the comparison of the performance of an algorithm MC-PILCO, an algorithm Black-DROPS and an algorithm PILCO, according to embodiments of the present invention.
FIG. 6B shows a table with the comparison of the percentage of success rate of an algorithm MC-PILCO, an algorithm Black-DROPS and an algorithm PILCO, according to embodiments of the present invention.

This fact suggests that the use of too selective cost functions might decrease significantly the probability of converging to a solution. The reason might be that with small valued lengthscales, $c(x_t)$ is very peaked, resulting in almost null gradient, when the policy parameters are far from a good configuration, and increasing the probability of getting stuck in a local minimum. Instead, higher values of the lengthscales promote the presence of non-null gradients also far away from the objective, facilitating the policy optimization procedure. These observations have already been made in PILCO, but they did not encountered difficulties in using a small lengthscale such as 0.25 in (20). This may be due to the analytic computation of the policy gradient made possible thanks to moment matching, as well as to the different optimization algorithm used. On the other hand, the lengthscales' values seems to have no effect on the precision of the learned solution. To confirm this, in FIG. 6C, rows 3-4, are reported the average distances from the target states obtained by successful policies at trial 5 during the last second of interaction. No significant differences in term of precision in reaching the targets can be observed.

Dropout

Figures 3A, 3B:
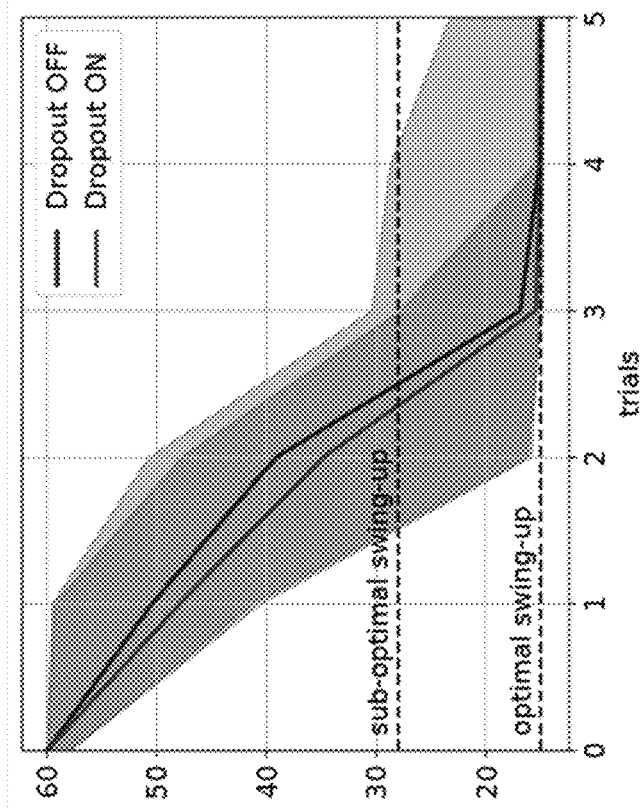
FIG. 3A shows a plot of the performance of an algorithm MC-PILCO when the Dropout method is considered and when the Dropout method is not considered, according to embodiments of the present invention.
FIG. 3B shows a table of the percentage of success rate of an algorithm MC-PILCO when the Dropout method is considered and when the Dropout method is not considered, according to embodiments of the present invention.

In this test, we compared the results obtained using, or not, the dropout during policy optimization. In FIG. 3A and FIG. 3B, we compare the evolution of the cumulative cost obtained in the two cases and we show the obtained success rates.

In both scenarios, we adopted the speed-integration model with SE kernel and a cost function with lengthscales ($l_\theta=3$, $l_p=1$). When using dropout, MC-PILCO learned the optimal solution at trial 4 in the 94% of the experiments, and it managed to obtain it for all the random seeds by trial 5. Instead, without dropout, the optimal policy has not always been found, even in the last trial. Notice that, when dropout is not used, the upper bounds of the cumulative costs in the last two trials are higher, and the task cannot be always solved. Additionally, FIG. 6C, rows 2-4, shows that using dropout also helps in decreasing the cart positioning error at the end of the swing-up (in terms of both mean and standard deviation).

Empirically, we found that dropout not only helps in stabilizing the learning process and in finding better solutions more consistently, but it can also improve the precision of the learned policies.

Kernel Function

Figures 4A, 4B:
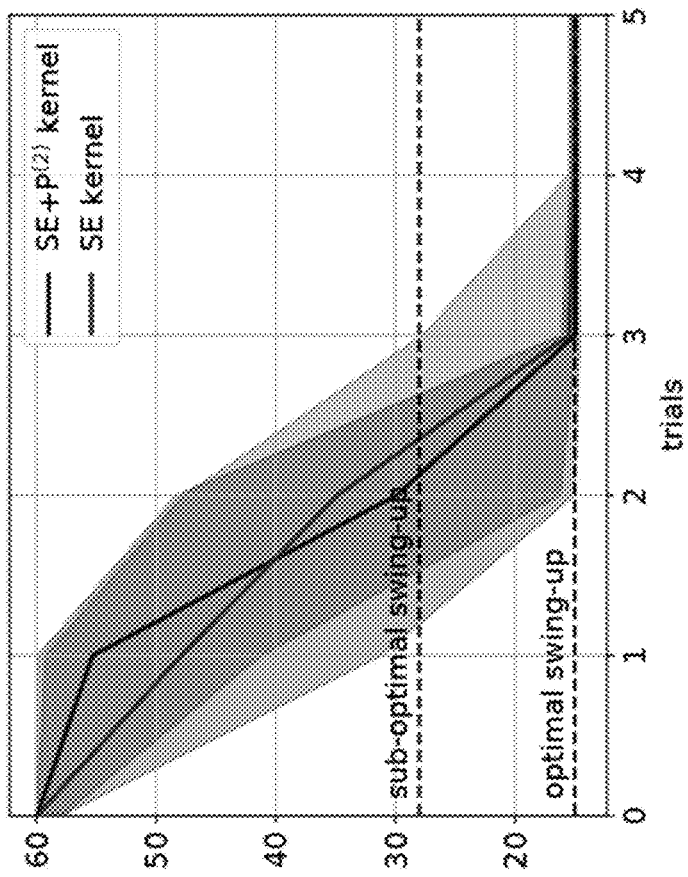
FIG. 4A shows a plot of the performance of an algorithm MC-PILCO when two different kernel functions are used, according to embodiments of the present invention.
FIG. 4B shows a table of the percentage of success rate of an algorithm MC-PILCO when two different kernel functions are used, according to embodiments of the present invention.

In this test, we compared the results obtained using either the SE or SE+P$^{(2)}$ kernel. In both cases, we adopted a speed-integration model, the cost function was defined with lengthscales ($l_\theta=3$, $l_p=1$), and dropout was used. FIG. 4A and FIG. 4B show that SE+P$^{(2)}$ is faster to converge to the optimal solution than SE. With the SE+P$^{(2)}$ kernel, the algorithm learns the task at trial 3 in 90% of the cases, and it obtains a success rate of 100% at trial 4. On the other hand, when using the SE kernel, only at trial 5 the task is solved for all the random seeds. This can be explained by the capacity of a more structured kernel to learn a correct enough dynamics of the system also in areas of the state-action space with no available data points. In fact, some parts of the dynamics of the cart-pole system are polynomial functions of the GP input $\tilde{x}_t = (\bar{x}_t, u_t)$ and the structure of the SE+P$^{(2)}$ improves the data-efficiency of the model learning.

Speed-Integration Model

Figures 5A, 5B:
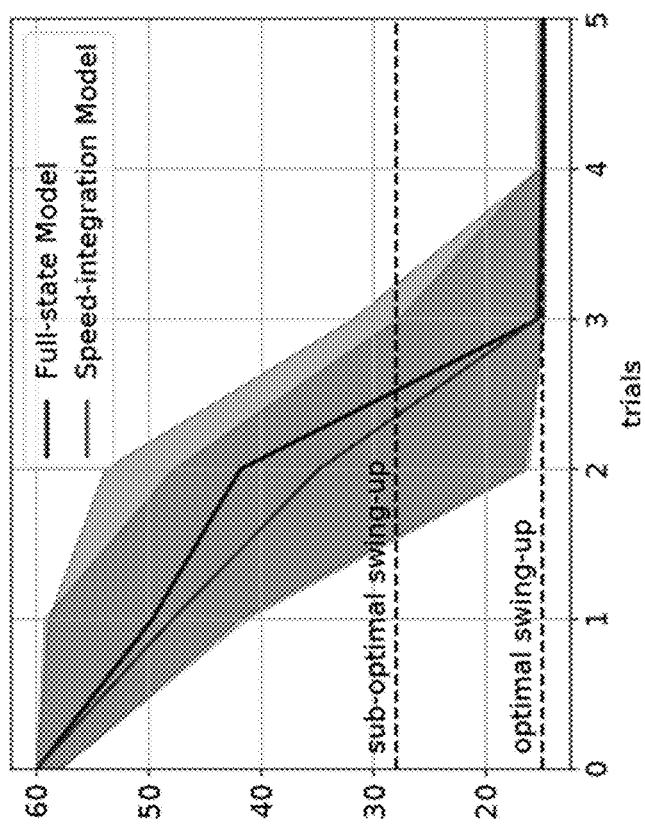
FIG. 5A shows a plot of the performance of an algorithm MC-PILCO when the Full-state Model or the Speed-integration Model is used during model learning, according to embodiments of the present invention.
FIG. 5B shows a table of the percentage of success rate of an algorithm MC-PILCO when the Full-state Model or the Speed-integration Model is used during model learning, according to embodiments of the present invention.

In this test, we compared the performance obtained by the proposed speed-integration dynamical model and by the standard full-state model. In both cases, SE kernels were chosen, the cost function was defined with lengthscales ($l_\theta=3$, $l_p=1$), and dropout was used. FIG. 5A and FIG. 5B show that the speed-integration model obtains better performance at trials 2 and 3, with narrower confidence intervals and better success rates. On the contrary, during the last two trials, the success rate of the full-state model is slightly better. Recall, that in the full-state model, positions and velocities are learned independently, while, in the speed-integration model, the position is computed as the integral of the velocity under a constant acceleration assumption. Then, the speed-integration model may reduce uncertainty in long-term predictions and facilitate the learning w.r.t. the counterpart when few data points have been collected. In fact, the full-state model could face some difficulties in learning the connection between positions and respective velocities from a limited amount of data. This reduction of the uncertainty may explain the narrower confidence intervals observed during the first trials of the experiment. On the other hand, when enough data points have been collected (trials 4 and 5), the improvement in precision obtained by full-state model is not very significant. Even with comparable performance, the choice of the speed-integration model is justified since it halves the number of GPs to learn, hence this structure is also improving the computational time.

Experiments in Simulation

In the following, two simulated systems are considered. First, MC-PILCO is tested on a cart-pole system and compared to other policy gradient algorithms, namely PILCO and Black-DROPS. In the same environment, we tested the capability of MC-PILCO to handle bimodal probability distributions. Second, MC-PILCO learns a controller in joint space of a UR5 robot arm, considered as an example of a higher DoF system.

Cart-Pole: Comparison With Other Methods

We tested PILCO, Black-DROPS, and MC-PILCO on the cart-pole system previously described. In MC-PILCO, we considered the cost function (19) with lengthscales ($l_\theta$=3, $l_p$=1) and SE kernels, in order to have the same kernel functions in all the three algorithms. Results of the cumulative cost are reported in FIG. 6A and FIG. 6B. MC-PILCO achieved the best performance both in transitory and at convergence, by trial 5, it learned how to swing up the cart-pole with a success rate of 100%. In each and every trial, MC-PILCO obtained cumulative costs with lower median and less variability. On the other hand, the policy in PILCO showed poor convergence properties with only 42% of success rate after all the 5 trials. Black-DROPS outperforms PILCO, but it obtained worse results than MC-PILCO in each and every trial, with a success rate of only 86% at trial 5. Recall that MC-PILCO obtains even better performance when considering SE+P$^{(2)}$ kernel. Results in FIG. 6C, rows 1-2-6-7, also show that policies learned with MC-PILCO are more precise in reaching the target.

Cart-Pole: Handling Bimodal Distributions

One of the main advantages of particle-based policy optimization is the capability to handle multimodal state evolutions. This is not possible when applying methods based on moment matching, such as PILCO. We verified this advantage by applying both PILCO and MC-PILCO to the simulated cart-pole system, when considering a very high variance on the initial cart position, $\sigma_p^2$=0.5, which corresponds to have unknown cart's initial position (but limited within a reasonable range). The aim is to be in a situation in which the policy has to solve the task regardless of the initial conditions and needs to have a bimodal behaviour in order to be optimal. Note that the situation described could be relevant in several real applications. We kept the same setup used in previous cart-pole experiments, changing the initial state distribution to a zero mean Gaussian with covariance matrix diag([0.5,10$^{-4}$,10$^{-4}$,10$^{-4}$])). MC-PILCO optimizes the cost in (19) with lengthscales ($l_\theta$=3, $l_p$=1). We tested the policies learned by the two algorithms starting from nine different cart initial positions (−2, −1.5, −1, −0.5, 0, 0.5, 1, 1.5, 2 [m]). Previously, we observed that PILCO struggles to consistently converge to a solution and the high variance in the initial conditions accentuates this issue. Nevertheless, in order to make the comparison possible, we cherry-picked a random seed for which PILCO converged to a solution in this particular scenario. In FIG. 7A and FIG. 7B, we show the results of the experiment. MC-PILCO is able to handle the initial high variance. It learned a bimodal policy that pushes the cart in two opposite directions, depending on the cart's initial position, and stabilizes the system in all the experiments. On the contrary, PILCO's policy is not able to control the cart-pole for all the tested starting conditions. Its strategy is always to push the cart in the same direction, and it cannot stabilize the system when the cart starts far away from the zero position. The state evolution under MC-PILCO's policy is bimodal, while PILCO cannot find this type of solutions because of the unimodal approximation enforced by moment matching.

In this example, we have seen that a multimodal state evolution could be the optimal solution, when starting from a unimodal state distribution with high variance, due to dependencies on initial conditions. In other cases, multimodality could be directly enforced by the presence of multiple possible initial conditions that would be badly modeled with a single unimodal distribution. MC-PILCO can handle all these situations thanks to its particle-based method for long-term predictions. Similar results were obtained when considering bimodal initial distributions. Due to space constraints, we do not report the results obtained, but the experiment is available in the code in supplementary material.

UR5 Joint-Space Controller: High DoF Application

Figure 8:
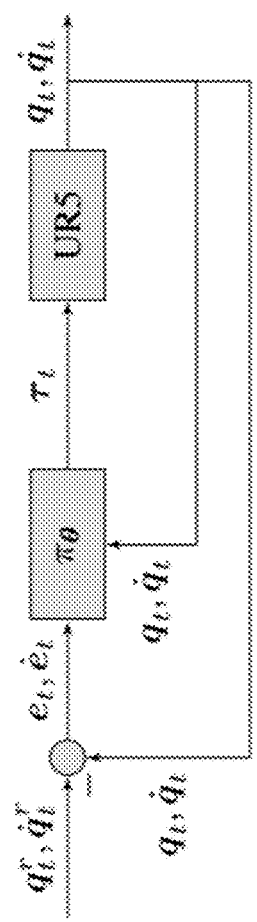
FIG. 8 shows a block diagram of the control scheme used to do trajectory tracking of a robot manipulator, according to embodiments of the present invention.

The objective of this experiment is to test MC-PILCO in a more complex system with higher DoF. We used MC-PILCO to learn a joint-space controller for a UR5 robotic arm (6 DoF) simulated in MuJoCo. Let the state at time t be $x_t[q_t,\dot{q}_t^T]^T$, where $q_t,\dot{q}_t \in R^6$ are joint angles and velocities, respectively. The objective for the policy $\pi_\theta$ is to control the torques $\tau_t$ in order to follow a desired trajectory $(q_t^r,\dot{q}_t^r)$ for t=1, ... ,T. Let $e_t=q_t^r-q_t, \dot{e}_t=\dot{q}_t^r-\dot{q}_t$ be position and velocity errors at time t, respectively. The policy is a multi-output squashed-RBF-network defined in (11) with $n_b$=400 Gaussian basis functions and $u_{max}$=1 [N·m] for all the joints, that maps states and errors into torques, $\pi_\theta: q_t,\dot{q}_t,e_t,\dot{e}_t \mapsto \tau_t$. The control scheme is represented in FIG. 8.

In this experiment, we considered a control horizon of 4 seconds with a sampling time of 0.02 seconds. The reference trajectory has been calculated to make the end-effector to draw a circle in the X-Y operational space. The initial exploration, used to initialize the speed-integration dynamical model, is provided by a poorly-tuned PD controller. We used SE+P$^{(1)}$ kernels in the GP dynamical model. The GP reduction thresholds were set to 10$^{-3}$. GP input was built using extended state $\bar{x}_t$=[$\dot{q}_t$,sin($q_t$),cos($q_t$)]. M=200 is the number of particles used for gradient estimation. The cost function considered is defined as, $$c(x_t) = 1 - \exp\left(-\left(\frac{\|q_t^r - q_t\|}{0.5}\right)^2 - \left(\frac{\|\dot{q}_t^r - \dot{q}_t\|}{1}\right)^2\right).$$

We assumed full state observability with measurements perturbed by a white noise with standard deviation of 10$^{-3}$. The initial state distribution is a Gaussian centered on ($q_0^r,\dot{q}_0^r$) with standard deviation of 10$^{-3}$. Policy optimization parameters are the same reported in FIG. 1E, with the exception of $n_s=400$ and $\delta_s=0.05$, to enforce more restrictive exit conditions.

Figures 9A, 9B:
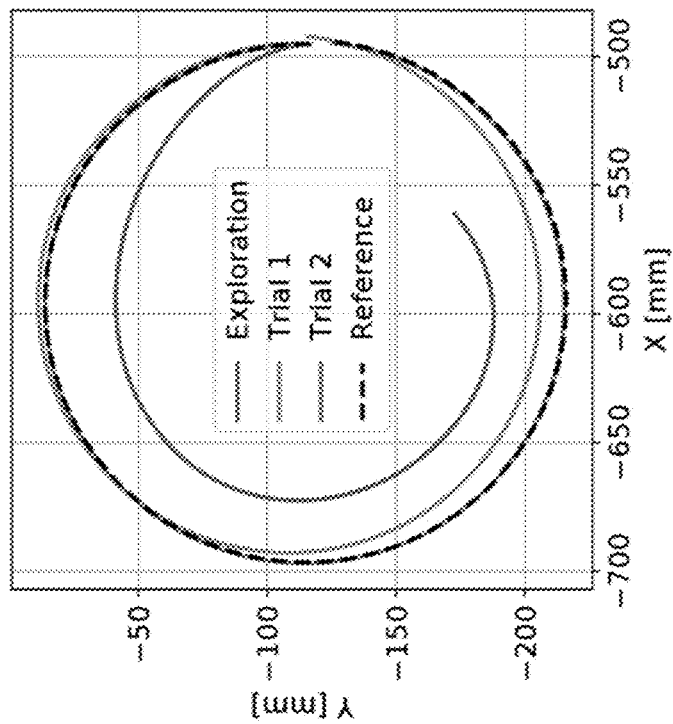
FIG. 9A shows a plot with the trajectories of a robot manipulator controlled by an algorithm MC-PILCO to learn how to track a circular trajectory, according to embodiments of the present invention.
FIG. 9b shows a table with the mean and max error of a robot manipulator controlled by an algorithm MC-PILCO to learn how to track a circular trajectory, according to embodiments of the present invention.

In FIG. 9A and FIG. 9B, we report the trajectory followed by the end-effector at each trial, together with the desired trajectory. MC-PILCO considerably improved the high tracking error obtained with the PD controller after only 2 trials (corresponding to 8 seconds of interaction with the system). The learned control policy followed the reference trajectory for the end-effector with a mean error of 0.65±0.69 [mm] (confidence interval computed as 3×standard deviation), and a maximum error of 1.08 [mm].

MC-PILCO for Partially Measurable Systems

In the following, we discuss the application of MC-PILCO to systems where the state is partially measurable, i.e., systems whose state is observable, but only some components of the state can be directly measured, while the rest must be estimated from measurements. For simplicity, we introduce the problem discussing the case of mechanical system where only positions (and not velocities) can be measured, but similar considerations can be done for any partially measurable system with observable state. Then, we describe MC-PILCO for partially measurable systems (MC-PILCO4PMS), a modified version of MC-PILCO, proposed to deal with such setups. The algorithm MC-PILCO4PMS is validated in simulation as a proof of concept.

MC-PILCO4PMS

Consider a mechanical systems where only joint positions can be measured. This can be described as a partially measurable system, where in the state $x_t=[q_t^T, \dot{q}_t^T]^T$ only $q_t$ is measured. Consequently, the $\dot{q}_t$ elements are estimated starting from the history of $q_t$ measurements through proper estimation procedures, possibly performing also denoising operations of $q_t$ in case that the measurement noise is high. In particular, it is worth distinguishing between estimates computed online and estimates computed offline. The former are provided to the control policy to determine the system control input, and they need to respect real-time constraints, namely, velocity estimates are causal and computations must be performed within a given interval. The latter, do not have to deal with such constraints. As a consequence, offline estimates can be more accurate, taking into account acausal information and limiting delays and distortions.

In this context, we verified that, during policy optimization, it is relevant to distinguish between the particle state predictions computed by the models and the data provided to the policy. Indeed, GPs should simulate the real system dynamics, independently of additional noise given by the sensing instrumentation, so they need to work with the most accurate estimates available; delays and distortions might compromise the accuracy of long-term predictions. On the other hand, providing to the policy directly the particles' states computed with the GPs during policy optimization, correspond to train the policy assuming available access directly to the system state, which, as mentioned before, is not possible in the setup considered. Indeed, considerable discrepancies between the particles' states and the state estimates computed online during the policy application to the real system might compromise the effectiveness of the policy. This approach differentiate from standard MBRL approaches where, typically, the effects of the online state estimators are not considered during training.

To deal with the above issues, we introduce MC-PILCO4PMS a modified version of MC-PILCO. In MC-PILCO4PMS we propose the two following additions w.r.t. MC-PILCO.

Computation of the GPs Training Data With an Offline State Estimator

We compute the state estimates used to train the GP models with an offline state estimator. In particular, in our real experiments, we considered two options Computation of the velocities with the central difference formula, i.e., $\dot{q}_t=(q_{t+1}-q_{t-1})/(2T_s)$, where $T_s$ is the sampling time. This technique can be used only when the measurement noise is limited, otherwise the $\dot{q}$ estimates might be too noisy.

Estimation of the state with a Kalman smoother, with state-space model given by the general equations relating positions, velocities, and accelerations. The advantage of this technique is that it exploits the correlation between positions and velocities, increasing regularization.

Simulation of the Online Estimators

Figure 10A:
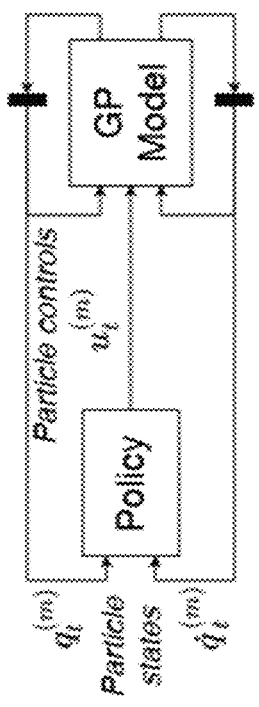
FIG. 10A shows a block diagram to represent the particles generation for policy optimization of an algorithm MC-PILCO, according to embodiments of the present invention.
Figure 10B:
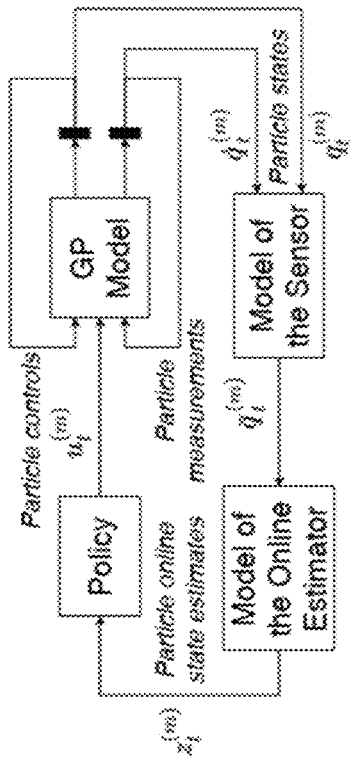
FIG. 10B shows a block diagram to represent the particles generation for policy optimization of an algorithm MC-PILCO4PMS, according to embodiments of the present invention.

During policy optimization, instead of simulating only the evolution of the particles states, we simulate also the measurement system with the model of sensor and the online estimators with the model of the online estimator. The state feed to the policy, denoted $z_t$, is computed to resemble the state that will be estimated online. Given the m-th particle, this is:

$$z_t^{(m)}=f_z(\bar{q}_t^{(m)} \ldots \bar{q}_{t-m_q}^{(m)}, z_{t-1}^{(m)} \ldots z_{t-1-m_z}^{(m)}),$$

where $f_z$ denotes the online state estimator, with memory $m_q$ and $m_z$, and $\dot{q}_t^{(m)}$ is a fictitious noisy measurement of the m-th particle positions. More precisely, let $q_t^{(m)}$ the positions of the $x_t^{(m)}$ particle state, then, we have $$\bar{q}_t^{(m)}=q_t^{(m)}+e_t^{(m)}, \quad (19)$$

where $e_t^{(m)} \in R^{d_x/2}$ is Gaussian i.i.d. noise with zero mean and covariance $\text{diag}([\sigma_z^{(1)} \ldots \sigma_2^{(d_x/2)}])$. The $\sigma_z^{(i)}$ s values must be tuned in accordance with the properties of the measurement system, e.g., the accuracy of the encoder. Then, the control input of the m-th particle is computed as $\pi_\theta(z_t^{(m)})$, instead than $\pi_\theta(x_t^{(m)})$. Differences in particles generation between MC-PILCO and MC-PILCO4PMS are summed up in the block scheme reported in FIG. 10A and FIG. 10B.

Simulation Results

Figures 11A, 11B:
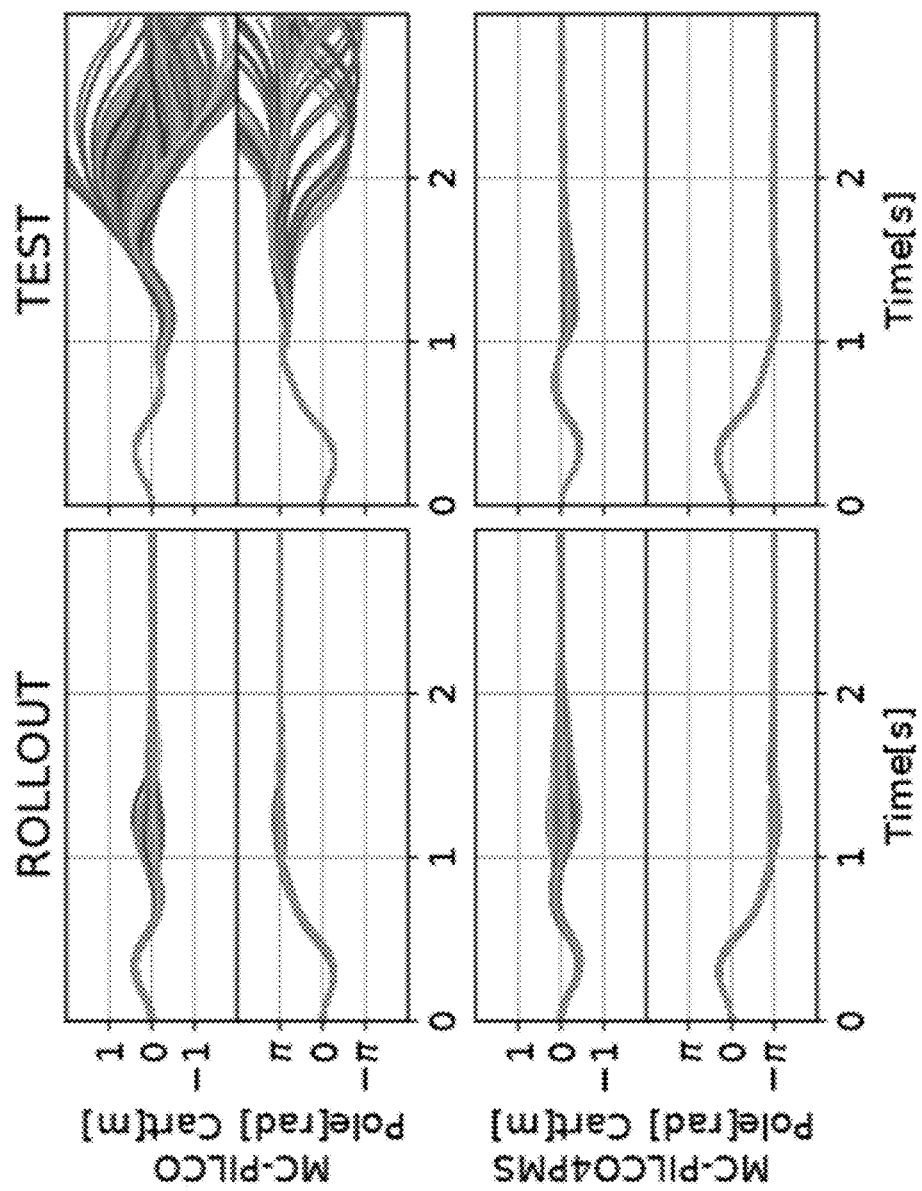
FIG. 11A shows two plots with the rollout of a Cart-pole system. In the top plot the system is controlled by an algorithm MC-PILCO and in the bottom plot the system is controlled by an algorithm MC-PILCO4PMS, according to embodiments of the present invention.
FIG. 11B shows two plots with the evolution at test time of a Cart-pole system. In the top plot the system is controlled by an algorithm MC-PILCO and in the bottom plot the system is controlled by an algorithm MC-PILCO4PMS, according to embodiments of the present invention.

Here, we test the relevance of modeling the presence of online estimators using the simulated cart-pole system, but adding assumptions that emulate a real world experiment. We considered the same physical parameters and the same initial conditions described for the car-pole system described previously, but assuming to measure only the cart position and the pole angle. We modeled a possible measurement system that we would have in the real world as an additive Gaussian i.i.d. noise with standard deviation $3 \cdot 10^{-3}$. In order to obtain reliable estimates of the velocities, samples were collected at 30 [Hz]. The online estimates of the velocities were computed by means of causal numerical differentiation followed by a first order low-pass filter, with cutoff frequency 7.5 [Hz]. The velocities used to train the GPs were derived with the central difference formula. The effectiveness of MC-PILCO4PMS w.r.t. MC-PILCO is verified in this system. Exploration data were collected with a random exploration policy. To avoid dependencies on initial conditions, such as policy initialization and exploration data, we fixed the same random seed in both experiments. In FIG. 11A and FIG. 11B, we report the results of a Monte Carlo study with 400 runs. On FIG. 11A, the final policy is applied to the learned models (ROLLOUT) and on FIG. 11B to the cartpole system (TEST). Even though the two policies perform similarly when applied to the models, which is all can be tested offline, the results obtained by testing the policies in the cartpole system are significantly different. MC-PILCO4PMS solves the task in all 400 attempts. In contrast, in several attempts, MC-PILCO does not solve the task, due to delays and discrepancies introduced by the online filter and not considered during policy optimization. We believe that these considerations on how to manipulate the data during model learning and policy optimization might be beneficial for other MBRL algorithms different from MC-PILCO.

Experiments With Example Systems

Figure 12B:
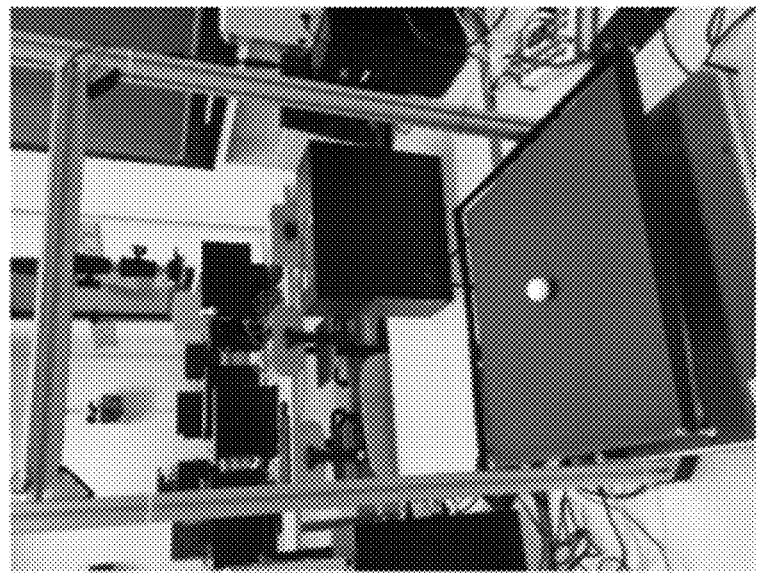
FIG. 12B shows a photo of a Ball and Plate real system, according to embodiments of the present invention.
Figure 12A:
FIG. 12A shows a photo of a Furuta Pendulum real system, according to embodiments of the present invention.

In the following, we test MC-PILCO4PMS when applied to real systems. In particular, we experimented on two benchmark systems: a Furuta pendulum, FIG. 12A, and a ball-and-plate, FIG. 12B. These are only few examples of real systems to which some embodiments of the present invention can be applied. Other examples of real systems could be robot manipulators, vehicles and suspension systems.

Furuta Pendulum

The Furuta pendulum (FP) is a popular benchmark system used in nonlinear control and reinforcement learning. The system is composed of two revolute joints and three links. The first link, called the base link, is fixed and perpendicular to the ground. The second link, called arm, rotates parallel to the ground, while the rotation axis of the last link, the pendulum, is parallel to the principal axis of the second link, see FIG. 12A. The FP is an under-actuated system as only the first joint is actuated. In particular, in the FP considered the horizontal joint is actuated by a DC servomotor, and the two angles are measured by optical encoders with 4096 [ppr]. The control variable is the motor voltage. Let the state at time step t be $x_t=[\theta_t^h,\dot{\theta}_t^h,\theta_t^v,\dot{\theta}_t^v]^T$, where $\theta_t^h$ is the angle of the horizontal joint and $\theta_t^v$ of the vertical joint attached to the pendulum. The objective is to learn a controller able to swing-up the pendulum and stabilize it in the upwards equilibrium ($\theta_t^v=\pm\pi$ [rad]) with $\theta_t^h=0$ [rad]. The trial length is 3 seconds with a sampling frequency of 30 [Hz]. The cost function is defined as $$c(x_t) = 1 - \exp\left(-\left(\frac{\theta_t^h}{2}\right)^2 - \left(\frac{|\theta_t^v|-\pi}{2}\right)^2\right) + c_b(x_t), \text{ with} \quad (20)$$

$$c_b(x_t) = \frac{1}{1+\exp\left(-10\left(-\frac{3}{4}\pi - \theta_t^h\right)\right)} + \frac{1}{1+\exp\left(-10\left(\theta_t^h - \frac{3}{4}\pi\right)\right)}.$$

The first part of the function in (20) aims at driving the two angles towards $\theta_t^h=0$ and $\theta_t^v=\pm\pi$, while $c_b(x_t)$ penalizes solutions where $$\theta_t^h \leq -\frac{3}{4}\pi \text{ or}$$

$$\theta_t^h \geq \frac{3}{4}\pi.$$

Figures 13A, 13B:
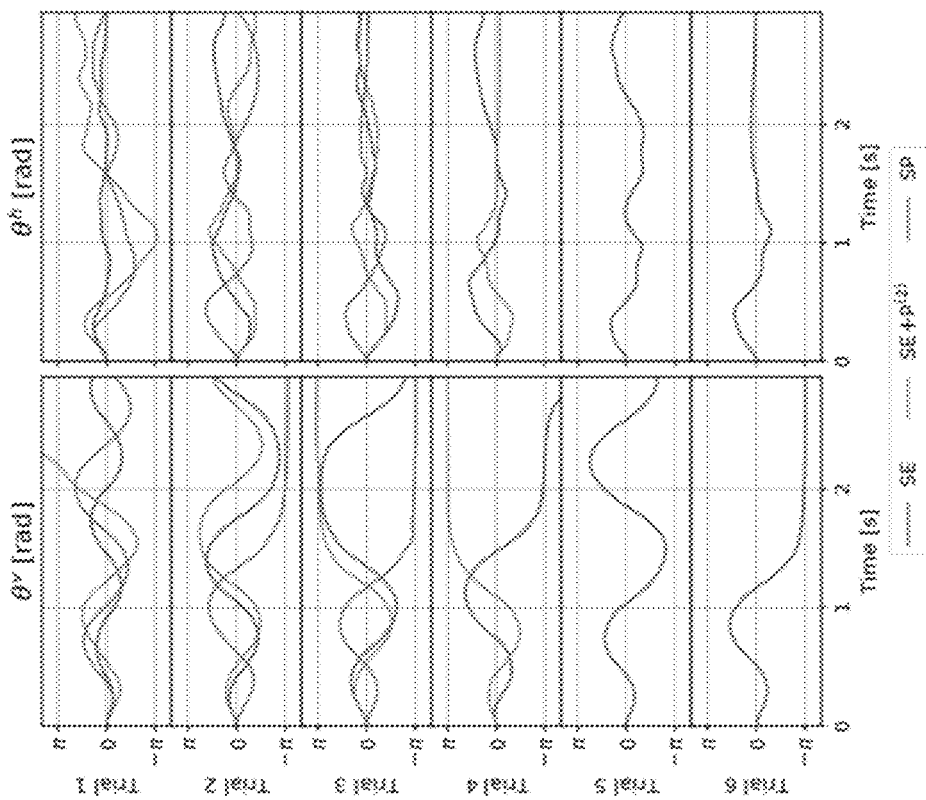
FIG. 13A shows plots with the trajectories of a vertical angle of a Furuta Pendulum system when an algorithm MC-PILCO4PMS is learning how to control the system, according to embodiments of the present invention.
FIG. 13B shows plots with the trajectories of a horizontal angle of a Furuta Pendulum system when an algorithm MC-PILCO4PMS is learning how to control the system, according to embodiments of the present invention.

We set those boundaries to avoid the risk of damaging the system if the horizontal joint rotates too much. Offline estimates of velocities for the GP model have been computed by the offline state estimator using central differences. For the online state estimator, we used causal numerical differentiation: $\dot{q}_t=(q_t-q_{t-1})/(T_s)$, where $T_s$ is the sampling time. Instead of $x_t$, we considered the extended state $\bar{x}[\dot{\theta}_t^h,\dot{\theta}_t^v,\sin(\theta_t^h),\cos(\theta_t^h),\sin(\theta_t^v),\cos(\theta_t^v)]^T$ in GP input. The policy unit is a squashed-RBF-network with $n_b$=200 basis is functions that receives as input the particles online state estimates $\bar{z}_t=[(\theta_t^h-\theta_{t-1}^h)/T_s,(\theta_t^v-\theta_{t-1}^v)/T_s,\sin(\theta_t^h),\cos(\theta_t^h),\sin(\theta_t^v),\cos(\theta_t^v)]^T$. We used 400 particles to estimate the policy gradient from model predictions. The exploration trajectory has been obtained using as input a sum of ten sine waves of random frequencies and same amplitudes. The initial state distribution is assumed to be $N([0,0,0,0]^T, \text{diag}([5\cdot10^{-3},5\cdot10^{-3},5\cdot10^{-3},5\cdot10^{-3}])$. $M$=400 particles were used for gradient estimation, and the GP reduction thresholds were set to $10^{-3}$. We solved the task using the three different choices of kernel functions described above: squared exponential (SE), squared exponential+polynomial of degree d (SE+P$^{(d)}$) and semi-parametrical (SP). In FIG. 13A and FIG. 13B, we show the resulting trajectories for each trial.

MC-PILCO4PMS managed to learn how to swing up the Furuta pendulum in all cases. It succeeded at trial 6 with kernel SE, at trial 4 with kernel SE+P$^{(2)}$, and at trial 3 with SP kernel. These experimental results confirm the higher data efficiency of more structured kernels and the advantage that MC-PILCO4PMS offers by allowing any kind of kernel function. Moreover, we can observe the effectiveness of the cost function (20) in keeping $\theta_t^h$ always inside the desired boundaries in all the trials and for any kernel tested. Considering penalties similar to $c_b(x_t)$ inside the cost function could be enough to handle soft constraints also in other scenarios. A video of the FP experiment is available in the supplementary material.

Ball-and-Plate

The ball-and-plate system is composed of a square plate that can be tilted in two orthogonal directions by means of two motors. On top of it, there is a camera to track the ball and measure its position on the plate. Let $(b_t^x,b_t^y,\theta_t^y)$ are the angles of the two motors tilting the plate, at time t. So, the state of the system is defined as $x_t=[b_t^x,b_t^y,\dot{b}_t^x,\dot{b}_t^y,\theta_t^{(1)},\theta_t^{(2)},\dot{\theta}_t^{(1)},\dot{\theta}_t^{(2)}]^T$. The drivers of the motors allow only position control, and do not provide feedback about the motors angles. To keep track of the motor angles, we defined the control actions as the difference between two consecutive reference values sent to the motor controllers, and we limited the maximum input to a sufficiently small value, such that the motor controllers are able to reach the target angle within the sampling time. Then, in first approximation, the reference angles and the motor angles coincide, and we have $u_t^{(1)}=\theta_{t+1}^{(1)}-\theta_t^{(1)}$ and $u_t^{(2)}=\theta_{t+1}^{(2)}-\theta_t^{(2)}$. The objective of the experiment is to learn how to control the motor angles in order to stabilize the ball around the center of the plate. Notice that the control task, with the given definition of inputs, is particularly difficult because the policy must learn to act in advance, and not only react to changes in the ball position. The cost function is defined as $$c(x_t) = 1 - \exp(-g_t(x_t)), \text{ with}$$

$$g_t(x_t) = \left(\frac{b_t^x}{0.15}\right)^2 + \left(\frac{b_t^y}{0.15}\right)^2 + \left(\theta_t^{(1)}\right)^2 + \left(\theta_t^{(2)}\right)^2.$$

The trial length is 3 seconds, with a sampling frequency of 30 [Hz]. Measurements provided by the camera are very noisy, and cannot be used directly to estimate velocities from positions. We used a Kalman smoother for the offline filtering of ball positions $b_t^x,b_t^y$ and associated velocities $\dot{b}_t^x,\dot{b}_t^y$. In the control loop, instead, we used a Kalman filter to estimate online the ball state from noisy measures of positions. When simulating the online estimator during policy optimization, we tried both to perturb and to not perturb the positions of the predicted particles with some additive noise. We obtained similar performance in the two cases, this result may be due to the fact that the Kalman filter is able to effectively filter out the white noise added to particles.

Figure 14:
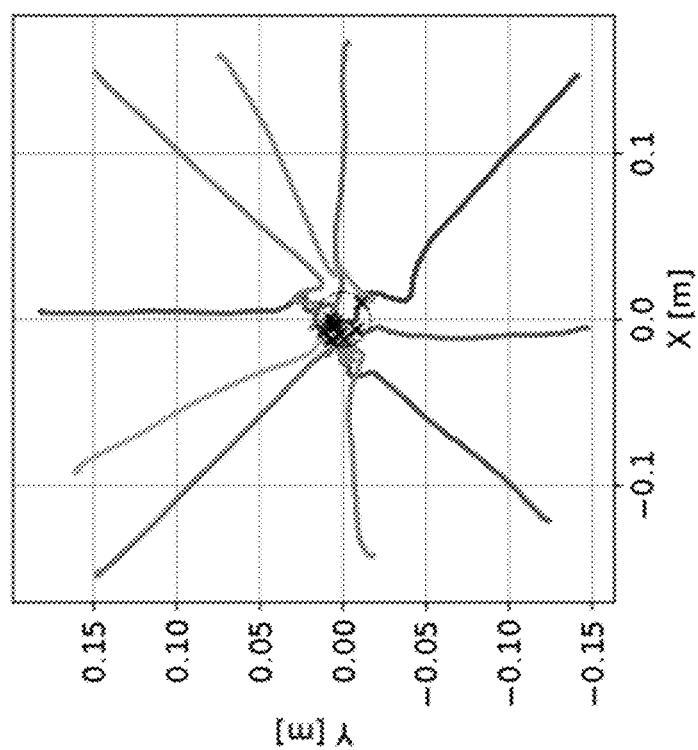
FIG. 14 shows a plot of the trajectories of a ball controlled by an algorithm MC-PILCO4PMS on a Ball and Plate system starting from several different initial conditions, according to embodiments of the present invention.

Concerning the model, we need to learn only two GPs predicting the evolution of the ball velocity because we directly control motor angles, hence, their evolution is assumed deterministic. GP inputs, $\tilde{x}_t = [\bar{x}_t, u_t]$, include an extended version of the state $\bar{x}_t = [b_t^x, b_t^y, \dot{b}_t^x, \dot{b}_t^y, \sin(\theta_t^{(1)}), \cos(\theta_t^{(2)}), \sin(\theta_t^{(2)}), \cos(\theta_t^{(2)}), (\theta_t^{(1)} - \theta_{t-1}^{(1)})/T_s, (\theta_t^{(2)} - \theta_{t-1}^{(2)})/T_s]^T$ where angles have been replaced by their sines and cosines, and motor angular velocities have been estimated with causal numerical differentiation ($T_s$ is the sampling time). The SE+P$^{(1)}$ kernel (10) is used, where the linear kernel acts only on a subset of the model inputs, $\tilde{x}_t^{lin} = [\sin(\theta_t^{(1)}), \sin(\theta_t^{(2)}), \cos(\theta_t^{(1)}), \cos(\theta_t^{(2)}), u_t]$. The GP reduction threshold is reduced to $10^{-4}$ because of the small distances that the ball can cover in one time step. We considered M=400 particles for policy gradient estimation. The policy unit is a multi-output RBF network (11), with $n_b$=400 basis functions, that receives as inputs the estimates of $(b_t^x, b_t^y, \dot{b}_t^x, \dot{b}_t^y, \theta_t^{(1)}, \theta_{t-1}^{(1)}, \theta_t^{(2)}, \theta_{t-1}^{(2)})$, computed with the Kalman filter; maximum angle displacement is $u_{max}$=4 [deg] for both motors. The policy optimization parameters used were the same described in FIG. 1E, with the difference that we used $\alpha_{lr}$=0.006 as initial learning rate. The reduction of the learning rate is related to the use of small lengthscales in the cost function, that are necessary to cope with the small range of movement of the ball. For the same reason, we set also $\alpha_{lr_{min}}$=0.0015 and $\sigma_s$=0.05. Initial exploration is given by two different trials, in which the control signals are two triangular waves perturbed by white noise. Mostly during exploration and initial trials, the ball might touch the borders of the plate. In those cases, we kept data up to the collision instant. A peculiarity of this experiment in comparison to the others seen before is a wide range of initial conditions. In fact, the ball could be positioned anywhere on the plate's surface, and the policy must control it to the center. The initial distribution of $b_0^x$ and $b_0^y$ is a uniform U(−0.15,0.15), which covers almost the entire surface (the plate is a square with sides of about 0.20 [m]). For the other state components, $\theta_t^{(1)}$ and $\theta^{(2)}$, we assumed tighter initial distributions U(−10$^{-6}$,10$^{-6}$). MC-PILCO4PMS managed to learn a policy able to control the ball around the center starting from any initial position after the third trial, 11.33 seconds of interaction with the system, see FIG. 14.

According to some embodiments of the present invention, the proposed framework can use GPs to derive a probabilistic model of the system dynamics, and updates the policy parameters through a gradient-based optimization; the optimization exploits the reparameterization trick and approximates the expected cumulative cost relying on a Monte Carlo approach. Compared to similar algorithms proposed in the past, the Monte Carlo approach worked by focusing on two aspects, that are (i) proper selection of the cost function, and (ii) introduction of exploration during the policy optimization through the use of dropout. We compared MC-PILCO with PILCO and Black-DROPS, that are two state-of-the-art GP-based MBRL algorithms. MC-PILCO outperforms both the algorithms, exhibiting better data-efficiency and asymptotic performance. The results obtained in simulation confirm the effectiveness of the proposed solution, and show the relevance of the two aforementioned aspects when optimizing the policy combining the reparameterization trick with particles-based approaches. Moreover, we explored two advantages due to the particles-based approximation w.r.t. the moment-matching adopted in PILCO, that are, the possibility of using structured kernels, such as polynomial kernel and semiparametrical kernel, and the ability of handling multimodal distributions. In particular, results obtained in simulation and with real systems show that the use of structured kernels can increase data-efficiency, reducing the interaction-time required to learn the task. Some embodiments show systems with partially measurable states, which are particularly relevant in real applications. Further, some embodiments can provide a modified algorithm called MC-PILCO4PMS, where we verified the importance of taking into account the state estimators used in the real system during policy optimization. Some results show different simulated scenarios, namely a cart-pole and a robotic manipulator, and also on real systems, such as a Furuta pendulum and a ball-and-plate setup.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the invention has been described by way of examples of preferred embodiments, it is to be understood that various other adaptations and modifications can be made within the spirit and scope of the invention.

Therefore, it is the object of the appended claims to cover all such variations and modifications as come within the true spirit and scope of the invention.

The invention claimed is:

1. A controller for controlling motion of a vehicle system, comprising:
   an interface operatively coupled to the vehicle system, wherein the interface is configured to acquire a motion state of the vehicle system and a measurement state via one or more motion sensors measuring the vehicle system;
   a memory configured to store computer-executable program modules including a first model learning module and a policy learning module;
   a processor configured to perform steps of the computer-executable program modules, the steps include:
      offline-modeling to generate offline states based on the motion state of the vehicle system and the measurement state using a model learning program, wherein the model learning program is configured to consider at least one of a squared exponential (SE) kernel and a multiplicative polynomial (MP) kernel or a semi-parametrical (SP) kernel to model the evolution of the vehicle system, wherein the SE kernel and the MP kernel use the Gaussian Process Regression (GPR) with Gaussian Processes (GP) input for model learning, wherein the GP input includes the motion state and an input of the vehicle system measured by the one or more motion sensors, wherein the first model learning module includes an offline estimator and a second model learning module, wherein the offline state estimator estimates and provides the offline states to the second model learning module, wherein the policy learning module generates Monte Carlo (MC) based particles, wherein the MC based particles are obtained by sampling from a probability distribution using a Monte Carlo approach to estimate expected cumulative cost from particle trajectories propagated through a learned model, and includes a model of an online estimator configured to generate particle online estimates based on particle measurements and prior particle online estimates, wherein the particle online estimates correspond to an approximation of the particle measurements;

providing the offline states to the policy learning module to generate policy parameters used in the MC based particles; and updating the policy of the vehicle system to operate the vehicle system based on the generated policy parameters.

2. The controller of claim 1, wherein the processor is further configured to perform a step of learning behavior of the vehicle system based on a speed-integration model.

3. The controller of claim 1, wherein the policy learning module includes a sensor model configured to generate particle measurements based on the particle states.

4. The controller of claim 1, wherein the second model-learning module is further configured to generate and provide offline learned states to the policy learning module, wherein the policy learning module generates policy parameters.

5. The controller of claim 4, wherein the computer-executable program modules further comprise a policy optimization program that is based on a Dropout method and an early stopping strategy configured to improve the policy parameters.

6. The controller of claim 1, wherein the offline states are generated based on-acausal filters, Kalman smoother or central difference velocity approximators.

7. The controller of claim 1, wherein the controller is connected to a motion controller of the vehicle system, wherein the controller is configured to provide the policy parameters to the motion controller of the vehicle system to update a policy of the motion controller.

8. The controller of claim 7, wherein the motion controller is configured to control suspensions of the vehicle system.

9. The controller of claim 7, wherein the motion controller is configured to control actuators of the vehicle system.

10. The controller of claim 7, further comprising a model of an online state estimator, wherein the model of the online state estimator performs policy optimization based on the offline states and generates the policy parameters.

11. The controller of claim 1, wherein the second model-learning module generates and provides offline learned states to the policy learning module, wherein the policy learning module includes a policy optimization program that performs policy optimization based on offline states from the first model learning module and generates the policy parameters.

12. The controller of claim 11, wherein the policy learning module includes a system model that generates current particle states based on previous particle states and the motion state of the vehicle system.

13. The controller of claim 1, wherein the vehicle system comprises a motion controller and a vehicle, wherein the processor is further configured to submit the generated policy parameters to the motion controller to update a policy unit of the motion controller in accordance with the generated policy parameters.

* * * * *